United States Patent
Jin et al.

(10) Patent No.: US 10,244,596 B2
(45) Date of Patent: Mar. 26, 2019

(54) LED DRIVE CIRCUIT HAVING IMPROVED FLICKER PERFORMANCE AND LED LIGHTING DEVICE INCLUDING THE SAME

(71) Applicant: Seoul Semiconductor Co., Ltd., Ansan-si (KR)

(72) Inventors: Sung Ho Jin, Ansan-si (KR); Sang Wook Han, Ansan-si (KR); Young Do Jung, Ansan-si (KR); Hyung Jin Lee, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 15/519,274

(22) PCT Filed: Oct. 14, 2015

(86) PCT No.: PCT/KR2015/010832
§ 371 (c)(1),
(2) Date: Apr. 14, 2017

(87) PCT Pub. No.: WO2016/060465
PCT Pub. Date: Apr. 21, 2016

(65) Prior Publication Data
US 2017/0231051 A1 Aug. 10, 2017

(30) Foreign Application Priority Data

Oct. 14, 2014 (KR) .................. 10-2014-0138368
Mar. 19, 2015 (KR) .................. 10-2015-0038211

(51) Int. Cl.
*H05B 33/08* (2006.01)

(52) U.S. Cl.
CPC ..... *H05B 33/0845* (2013.01); *H05B 33/0815* (2013.01)

(58) Field of Classification Search
None
See application file for complete search history.

(56) References Cited

U.S. PATENT DOCUMENTS

| 8,847,509 B2 | 9/2014 | Sakuragi et al. |
| 2011/0248640 A1 | 10/2011 | Welten |

(Continued)

FOREIGN PATENT DOCUMENTS

| CN | 102802303 | 11/2012 |
| EP | 2683223 | 1/2014 |

(Continued)

OTHER PUBLICATIONS

International Search Report dated Jan. 26, 2016, in International Application No. PCT/KR2015/010832.

(Continued)

*Primary Examiner* — Seokjin Kim
(74) *Attorney, Agent, or Firm* — H.C. Park & Associates, PLC

(57) ABSTRACT

Disclosed are a light emitting diode (LED) driver circuit having improved flicker performance and an alternating current-driving type LED lighting device including the same. The LED driver circuit can remove an LED off period using a charging and discharging circuit during a compensation period so as to reduce light output deviation of an LED lighting device, and provide a driving voltage to another element of the LED lighting device, using the charging and discharging circuit during an additional discharging period so as to simultaneously improve power efficiency.

9 Claims, 19 Drawing Sheets

(56) References Cited

U.S. PATENT DOCUMENTS

| | | | |
|---|---|---|---|
| 2012/0026636 A1* | 2/2012 | Chai | H02H 9/001 361/93.9 |
| 2012/0299489 A1* | 11/2012 | Sakuragi | H05B 33/0809 315/187 |
| 2012/0299495 A1* | 11/2012 | Sakuragi | H05B 33/0812 315/201 |
| 2015/0156841 A1* | 6/2015 | Musch | H05B 33/083 315/186 |
| 2015/0181666 A1 | 6/2015 | Muesch | |
| 2015/0359051 A1* | 12/2015 | Chu | H05B 33/0845 315/188 |

FOREIGN PATENT DOCUMENTS

| | | |
|---|---|---|
| KR | 10-2012-0043188 | 5/2012 |
| KR | 10-2014-0086561 | 7/2014 |
| KR | 10-2014-0102396 | 8/2014 |
| KR | 10-2014-0115552 | 10/2014 |

OTHER PUBLICATIONS

Patrial Supplementary European Search Report dated May 18, 2018, in European Patent Application 15850276.5.

\* cited by examiner

_US 10,244,596 B2_

LED DRIVE CIRCUIT HAVING IMPROVED FLICKER PERFORMANCE AND LED LIGHTING DEVICE INCLUDING THE SAME

CROSS-REFERENCE TO RELATED APPLICATIONS

This application is a National Stage Entry of International Application No. PCT/KR2015/010832, filed on Oct. 14, 2015, and claims priority from and the benefit of Korean Patent Application No. 10-2014-0138368, filed on Oct. 14, 2014, and Korean Patent Application No. 10-2015-0038211, filed on Mar. 19, 2015, which are hereby incorporated by reference for all purposes as if fully set forth herein.

BACKGROUND

Field

Exemplary embodiments of the present disclosure relate to a light emitting diode (LED) drive circuit with improved flicker performance and an LED lighting device including the same. More particularly, exemplary embodiments of the present disclosure relate to a light emitting diode (LED) drive circuit with improved flicker performance, which can reduce deviation in light output by removing an LED-off interval using a charge/discharge unit in a compensation interval of an alternating current (AC) driving type LED lighting device, and can improve power efficiency by supplying a drive voltage to other components of the LED lighting device using the charge/discharge unit in an additional discharge interval thereof, and an LED lighting device including the same.

Discussion of the Background

LED driving is generally performed by direct current (DC). A DC driving type lighting device requires an AC-DC converter such as an SMPS and the like, and such a power converter provides various problems to the lighting device, such as increase in manufacturing costs, difficulty in size reduction, deterioration in energy efficiency, and reduction in lifespan due to short lifespan of such a power converter.

In order to resolve such problems of DC driving, AC driving of LEDs has been suggested. However, an AC drive circuit causes not only decrease in power factor due to mismatch between input voltage and output power of LEDs, but also severe flickering perceivable by a user in the case where non-luminous intervals of the LEDs are extended.

FIG. 1 is a conceptual view of a flicker index. A definition and regulation of the flicker index as a reference flicker level in accordance with the Energy Star specifications will be described hereinafter.

(1) Definition of Flicker

Flicker means a phenomenon that brightness of lighting is changed for a certain period of time, and severe flicker can be perceived as shaking or flickering light by a user. Flicker is generally generated due to a difference between a maximum light output and a minimum light output for a certain period of time.

(2) Types of Flicker Index a) Flicker Index: As shown in FIG. 1, the flicker index means a value obtained by dividing an area (Area1) above the level of average light output by the total light output area (Area1+Area2) on a light output waveform of one cycle. Thus, the flicker index is a value numerically indicating frequency of illumination above the level of average light output in one cycle and a lower flicker index indicates a better flicker level.

b) Percent Flicker or Modulation Depth: Percent flicker refers to a value numerically indicating a minimum intensity of light and a maximum intensity of light for a certain period of time. Such a percent flicker can be calculated by 100× (maximum intensity of light−minimum intensity of light)/ (maximum intensity of light+minimum intensity of light).

(3) Flicker Level in Accordance with Energy Star Specifications

Light output waveform ≥120 Hz

Flicker index ≤frequency×0.001 (at Max. Dimmer, excluding flicker index at 800 Hz or more) (thus, flicker index at 120 Hz≤0.12)

(4) Study Result on Percent Flicker the reports regarding percent flicker say that % flicker <0.033×2 fac or less indicates no-effect intervals, and % flicker <0.033×2 fac or less indicates low risk intervals.

As described above, the issue of flicker level is of increasing concern in performance of LED lighting devices.

FIG. 2 is a block diagram of a conventional four-stage sequential driving type LED lighting device and FIG. 3 is a waveform diagram depicting a relationship between drive voltage and LED drive current of the conventional four-stage sequential driving type LED lighting device shown in FIG. 2. Next, problems of the conventional LED lighting device will be described with reference to FIG. 2 and FIG. 3.

First, as shown in FIG. 2, a conventional LED lighting device 100 may include a rectification unit 10, an LED light emitting unit 20, and an LED drive controller 30.

In the conventional LED lighting device 100, the rectification unit 10 generates rectified voltage Vrec through rectification of AC voltage VAC supplied from an external power source, and outputs the rectified voltage Vrec to the LED light emitting unit 20 and the LED drive controller 30. As the rectification unit 10, any well-known rectification circuit, such as a full-wave rectification circuit or a half-wave rectification circuit, may be used. In FIG. 2, a bridge full-wave rectification circuit composed of four diodes D1, D2, D3, D4 is shown. In addition, the LED light emitting unit 20 is composed of four LED groups including first to fourth LED groups 21 to 24, which may be sequentially turned on or off under control of the LED drive controller 30. On the other hand, the conventional LED drive controller 30 is configured to control the first to fourth LED groups 21 to 24 to be sequentially turned on or off according to a voltage level of the rectified voltage Vrec.

Particularly, the conventional LED drive controller 30 increases or decreases the LED drive current according to a voltage level of an input voltage (that is, rectified voltage Vrec) to perform constant current control in each sequential driving interval. As a result, the LED drive current has a stepped waveform approaching a sine wave, whereby power factor (PF) and total harmonic distortion (THD) of the LED lighting device can be enhanced, thereby improving power quality of the LED lighting device.

Here, operation of the conventional LED lighting device 100 will be described in more detail with reference to FIG. 3. Referring to FIG. 3, the LED drive controller 30 may include a first constant current switch SW1, a second constant current switch SW2, a third constant current switch SW3, and a fourth constant current switch SW4 in order to control sequential driving of the LED groups. Specifically, in an operation interval (first stage operation interval) in which the voltage level of the rectified voltage Vrec is higher than or equal to a first forward voltage level Vf1 and less than a second forward voltage level Vf2, the conventional LED drive controller 30 performs constant current control such that only the first LED group 21 is turned on and an LED drive current ILED becomes a first LED drive current ILED1. Similarly, in an operation interval (second stage operation interval) in which the voltage level of the rectified voltage Vrec is higher than or equal to the second forward voltage level Vf2 and less than a third forward voltage level Vf3, the conventional LED drive controller 30 performs constant current control by turning off the first constant current switch SW1 while turning on the second constant current switch SW2 such that only the first LED group 21 and the second LED group 22 are turned on and the LED drive current ILED becomes a second LED drive current ILED2. Further, in an operation interval (third stage operation interval) in which the voltage level of the rectified voltage Vrec is higher than or equal to the third forward voltage level Vf3 and less than a fourth forward voltage level Vf4, the conventional LED drive controller 30 performs constant current control by turning off the second constant current switch SW2 while turning on the third constant current switch SW3 such that the first to third LED groups 21 to 23 are turned on and the LED drive current $I_{LED}$ becomes a third LED drive current $I_{LED3}$. Last, in an operation interval (fourth stage operation interval) in which the voltage level of the rectified voltage Vrec is higher than or equal to the fourth forward voltage level Vf4, the conventional LED drive controller 30 performs constant current control by turning off the third constant current switch SW3 while turning on the fourth constant current switch SW4 such that all of the first to fourth LED groups 21 to 24 are turned on and the LED drive current $I_{LED}$ becomes a fourth LED drive current $I_{LED4}$. As shown in FIG. 3, the LED lighting device is controlled such that the LED drive current (that is, the first LED drive current $I_{LED1}$) in the first stage operation interval is greater than the LED drive current (that is, the second LED drive current $I_{LED2}$) in the second stage operation interval. Likewise, the LED lighting device is controlled such that the third LED drive current $I_{LED3}$ is greater than the second LED drive current $I_{LED2}$ and the fourth LED drive current $I_{LED4}$ becomes the greatest drive current. Accordingly, the entire light output of the conventional LED lighting device 100 has a stepped waveform, as shown in FIG. 3. Accordingly, since the total number and drive current of LEDs turned on to emit light differ according to the operation intervals, the conventional LED lighting device 100 provides different light outputs according to the operation intervals, thereby causing user inconvenience due to a difference in light output according to the operation intervals, and sever flickering, as described above. Namely, since the conventional sequential driving type LED lighting device as described above has a percent flicker of 100%, there is a need for improvement in flicker performance.

SUMMARY

Exemplary embodiments of the present disclosure have been conceived to solve the problems in the related art.

Exemplary embodiments of the present disclosure provide an LED drive circuit with improved flicker performance, which can provide natural light to a user through reduction in light output deviation by removing a non-luminous interval upon operation of an AC driving type LED lighting device, and an LED lighting device including the same.

Exemplary embodiments of the present disclosure provide an LED drive circuit with improved flicker performance, which can improve power efficiency through additional discharge of a charge/discharge unit, and an LED lighting device including the same.

The above and other objects and the following advantageous effects of the present disclosure can be achieved by features of exemplary embodiments of the present disclosure, which will be described hereinafter.

In accordance with one aspect of the present disclosure, a light emitting diode (LED) lighting device includes: a rectification unit connected to an AC power source and outputting a first rectified voltage as a first drive voltage to an LED light emitting unit through full-wave rectification of AC voltage applied thereto; the LED light emitting unit being turned on to emit light upon receiving the rectified voltage as the first drive voltage from the rectification unit in a non-compensation interval and to emit light upon receiving a second drive voltage from a first charge/discharge unit in a compensation interval; the first charge/discharge unit being charged with energy using the rectified voltage in a charge interval and supplying the second drive voltage to the LED light emitting unit in the compensation interval; and an LED drive controller controlling operation of the LED light emitting unit and the first charge/discharge unit, and allowing the first charge/discharge unit to be additionally discharged in an additional discharge interval between an increase interval of the rectified voltage and the charge interval.

Preferably, the additional discharge interval is an interval in which a voltage level of the rectified voltage is higher than or equal to a forward voltage level of the LED light emitting unit and a voltage level of the first charge/discharge unit is higher than or equal to the voltage level of the rectified voltage.

Preferably, the LED drive controller is configured to control the LED light emitting unit and the first charge/discharge unit to be connected in parallel to the LED drive controller in the additional discharge interval.

Preferably, the LED lighting device further includes: a first constant current switch disposed between a first node between a cathode of the LED light emitting unit and the first charge/discharge unit and the LED drive controller, and selectively forming a first current path under control of the LED drive controller; a second constant current switch disposed between a second node between the first charge/discharge unit and the group and the LED drive controller, and selectively forming a second current path under control of the LED drive controller; and a third constant current switch disposed between a third node between the first node and the first charge/discharge unit and the LED drive controller, and selectively forming a third current path under control of the LED drive controller, wherein, in the additional discharge interval, the LED drive controller is configured to allow the LED light emitting unit and the first charge/discharge unit to be connected in parallel by turning on the first constant current switch and the second constant current switch and to control the first charge/discharge unit to be additionally discharged through the third current path.

Preferably, the LED drive controller is configured to control a first current flowing through the first constant current switch, a second current flowing through the second constant current switch, and a third current flowing through the third constant current switch to realize a preset first constant current value, a preset second constant current value, and a preset third constant current value, respectively.

Preferably, the LED lighting device further includes a current restriction unit disposed between the third node and the third constant current switch.

Preferably, the LED drive controller is configured to supply a drive voltage to components of the LED lighting device by supplying an additional discharge current discharged from the first charge/discharge unit to the components of the LED lighting device through the third current path in the additional discharge interval.

Preferably, the LED lighting device further includes a second charge/discharge unit connected to the first charge/discharge unit through the third current path and configured to be charged with energy using the additional discharge current discharged from the first charge/discharge unit through the third current path in the additional discharge interval and to supply a drive voltage to the components of the LED lighting device using the charged energy.

In accordance with another aspect of the present disclosure, an LED drive circuit configured to control operation of an LED light emitting unit of an LED lighting device includes: a rectification unit connected to an AC power source and supplying a first rectified voltage as a first drive voltage to the LED light emitting unit through full-wave rectification of AC voltage applied thereto; a first charge/discharge unit charged with energy using the rectified voltage in a charge interval and supplying a second drive voltage to the LED light emitting unit in a compensation interval; and an LED drive controller controlling operation of the LED light emitting unit and the first charge/discharge unit and controlling the first charge/discharge unit to be additionally discharged in an additional discharge interval between an increase interval of the rectified voltage and the charge interval.

Preferably, the additional discharge interval is an interval in which a voltage level of the rectified voltage is higher than or equal to a forward voltage level of the LED light emitting unit and a voltage level of the first charge/discharge unit is higher than or equal to the voltage level of the rectified voltage.

Preferably, the LED drive controller is configured to control the LED light emitting unit and the first charge/discharge unit to be connected in parallel to the LED drive controller in the additional discharge interval.

Preferably, the LED drive circuit further includes: a first constant current switch disposed between a first node between a cathode of the LED light emitting unit and the first charge/discharge unit and the LED drive controller, and selectively forming a first current path under control of the LED drive controller; a second constant current switch disposed between a second node between the first charge/discharge unit and the ground and the LED drive controller, and selectively forming a second current path under control of the LED drive controller; and a third constant current switch disposed between a third node between the first node and the first charge/discharge unit and the LED drive controller, and selectively forming a third current path under control of the LED drive controller, wherein the LED drive controller is configured to allow the LED light emitting unit and the first charge/discharge unit to be connected in parallel and to allow the first charge/discharge unit to be additionally discharged through the third current path by turning on the first constant current switch and the second constant current switch in the additional discharge interval.

Preferably, the LED drive controller is configured to control a first current flowing through the first constant current switch, a second current flowing through the second constant current switch, and a third current flowing through the third constant current switch to realize a preset first constant current value, a preset second constant current value, and a preset third constant current value, respectively.

Preferably, the LED drive circuit further includes a current restriction unit disposed between the third node and the third constant current switch.

Preferably, the LED drive controller is configured to supply a drive voltage to components of the LED lighting device by supplying an additional discharge current discharged from the first charge/discharge unit to the components of the LED lighting device through the third current path in the additional discharge interval.

Preferably, the LED drive circuit further includes a second charge/discharge unit connected to the first charge/discharge unit through the third current path and configured to be charged with energy using the additional discharge current discharged from the first charge/discharge unit through the third current path in the additional discharge interval and to supply a drive voltage to the components of the LED lighting device using the charged energy.

In accordance with a further aspect of the present disclosure, an LED drive circuit includes: an LED light emitting unit; a rectification unit generating and outputting a drive voltage for driving the LED light emitting unit through full-wave rectification of AC power input thereto; a drive current controller controlling a drive current flowing to the LED light emitting unit; and a capacitor charged with energy for driving the LED light emitting unit under control of the drive current controller.

Preferably, the drive current controller includes a first diode connected in parallel to the LED light emitting unit; a first drive current circuit disposed between the LED light emitting unit and the capacitor and connected thereto in parallel; and a second drive current circuit connected in series to the first drive current circuit and the capacitor.

Preferably, the first and second drive current circuits include at least one diode or at least one switching element.

Preferably, the switching element includes a bipolar junction transistor (BJT), a field effect transistor (FET), and the like, without being limited thereto. For example, the switching element may be a metal oxide semiconductor field effect transistor (MOSFET).

Preferably, the first drive current circuit includes a first switching element connecting the LED light emitting unit to the capacitor in parallel, and the second drive current circuit includes a second switching element connecting the LED light emitting unit to the capacitor in series.

Preferably, the second drive current circuit includes a second diode connecting the LED light emitting unit to the capacitor in series, and the first drive current circuit includes a switching element connecting the LED light emitting unit to the capacitor in parallel.

Preferably, the LED drive circuit further includes a third drive current circuit disposed between the rectification unit and the LED light emitting unit.

Preferably, the third drive current circuit includes at least one diode or at least one switching element.

Preferably, the switching element includes a bipolar junction transistor (BJT), a field effect transistor (FET), and the like, without being limited thereto. For example, the switching element may be a MOSFET.

Preferably, the switching element further includes a third diode for stable constant current driving.

In accordance with yet another embodiment of the present disclosure, an LED drive circuit includes: an LED light emitting unit; a drive current controller controlling a drive current flowing to the LED light emitting unit; and a capacitor connected in series to the LED light emitting unit in a first interval in which an input voltage higher than or equal to a forward voltage level for driving the LED light emitting unit is supplied.

Preferably, the capacitor is connected in parallel to the LED light emitting unit in a second interval in which an input voltage less than the forward voltage level for driving the LED light emitting unit is supplied.

Preferably, the drive current controller includes: a first diode connected in parallel to the LED light emitting unit; a first drive current circuit disposed between the LED light emitting unit and the capacitor and connected thereto in parallel; and a second drive current circuit connected in series to the first drive current circuit and the capacitor.

Preferably, the first and second drive current circuit includes at least one diode or at least one switching element.

Preferably, the switching element includes a bipolar junction transistor (BJT), a field effect transistor (FET), and the like, without being limited thereto. For example, the switching element may be a MOSFET.

Preferably, the first drive current circuit includes a first switching element connecting the LED light emitting unit to the capacitor in parallel, and the second drive current circuit includes a second switching element connecting the LED light emitting unit to the capacitor in series.

Preferably, the second drive current circuit includes a second diode connecting the LED light emitting unit to the capacitor in series, and the first drive current circuit includes a switching element connecting the LED light emitting unit to the capacitor in parallel.

Preferably, LED drive circuit includes a third drive current circuit disposed between the rectification unit and the LED light emitting unit.

Preferably, the third drive current circuit includes at least one diode or at least one switching element.

Preferably, the switching element includes a bipolar junction transistor (BJT), a field effect transistor (FET), and the like, without being limited thereto. For example, the switching element may be a MOSFET.

Preferably, the switching element further includes a third diode for stable constant current driving.

Exemplary embodiments of the present disclosure can provide natural light to a user through reduction in light output deviation by removing a non-luminous interval using a charge/discharge unit.

Exemplary embodiments of the present disclosure can improve power efficiency through additional discharge of the charge/discharge unit.

DETAILED DESCRIPTION OF THE ILLUSTRATED EMBODIMENTS

Figure 1:
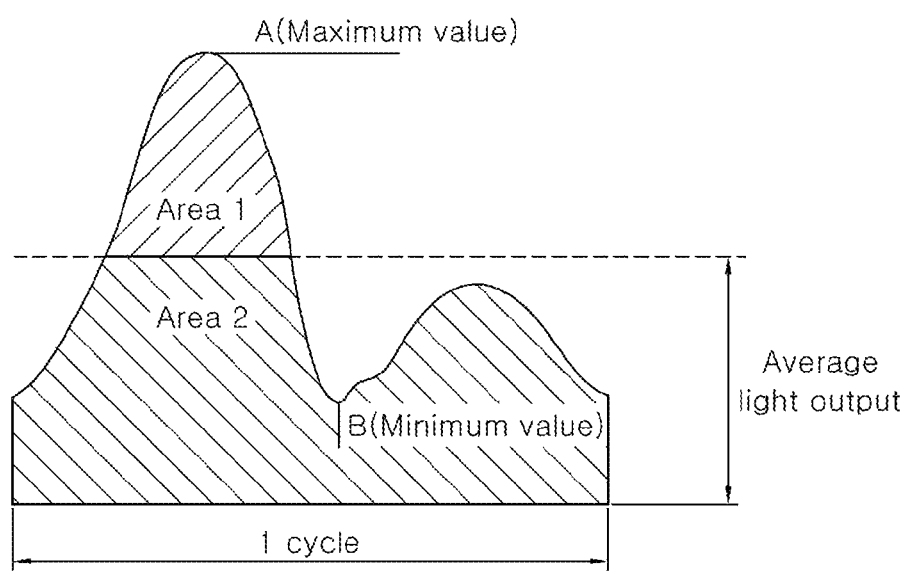
FIG. 1 is a conceptual view of flicker index.
Figure 2:
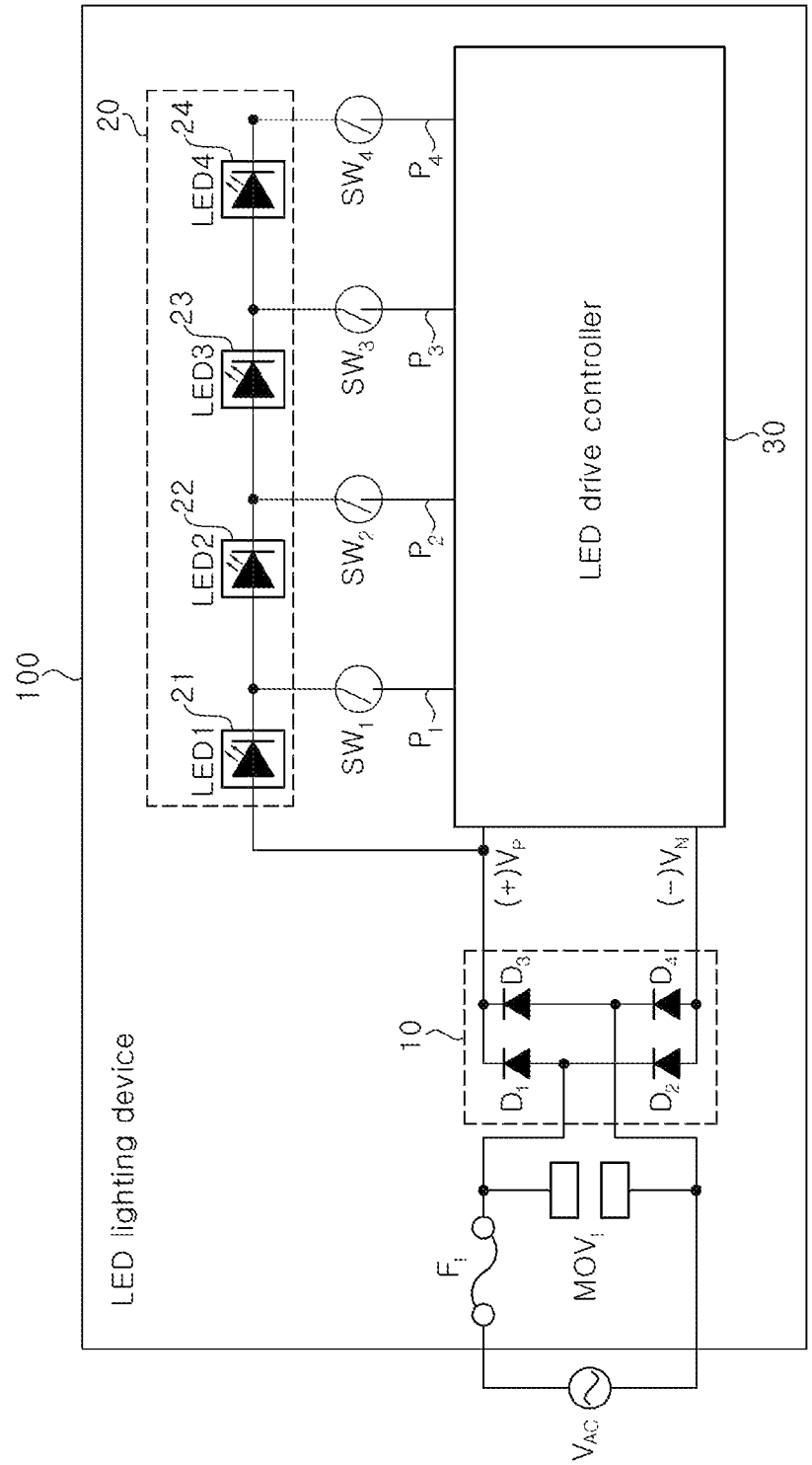
FIG. 2 is a schematic block diagram of a conventional four-stage sequential driving type LED lighting device.
Figure 3:
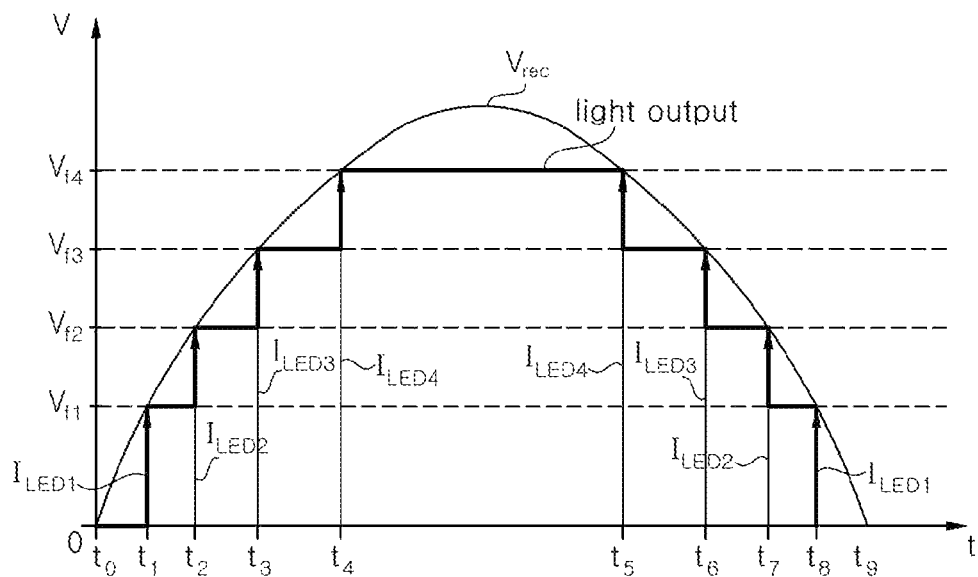
FIG. 3 is a waveform diagram depicting a relationship between drive voltage and LED drive current of the conventional four-stage sequential driving type LED lighting device shown in FIG. 2.

Hereinafter, exemplary embodiments of the present disclosure will be described in detail with reference to the accompanying drawings. The following embodiments are provided by way of example so as to fully convey the spirit of the present disclosure to those skilled in the art to which the present disclosure pertains. Although various embodiments are disclosed herein, it should be understood that these embodiments are not intended to be exclusive. For example, individual structures, elements or features of a particular embodiment are not limited to that particular embodiment and can be applied to other embodiments without departing from the spirit and scope of the present disclosure. In addition, it should be understood that location or arrangement of individual components in each of the embodiments can be changed without departing from the spirit and scope of the present invention. Therefore, the following embodiments are not to be construed as limiting the present disclosure, and the present disclosure should be limited only by the claims and equivalents thereof. Like components having the same or similar functions will be denoted by like reference numerals.

Hereinafter, exemplary embodiments of the present disclosure will be described in detail with reference to the accompanying drawings so as to be easily practiced by those skilled in the art.

As used herein, the term "LED light emitting unit" includes one or more LED groups and means a group of LEDs emitting light under control of an LED drive controller. In addition, the term "LED group" means a set of plural LEDs (or plural light emitting cells), which are interconnected in series/parallel/series-parallel such that operation of the LEDs (or light emitting cells) can be controlled as a single unit (that is, simultaneously turned on/turned off) by the LED drive controller.

As used herein, the term "first forward voltage level Vf1" means a critical voltage level capable of driving a first LED group, the term "second forward voltage level Vf2" means a critical voltage level capable of driving the first LED group and a second LED group connected to each other in series (that is, the sum of a forward voltage level of the first LED group and a forward voltage level of the second LED group), and the term "third forward voltage level Vf3" means a critical voltage level capable of driving the first to third LED groups connected to each other in series. Namely, the term "nth forward voltage level Vfn" means a critical voltage level capable of driving the first to nth LED groups connected to each other in series (that is, the sum of the forward voltage levels of the first to nth LED groups). Accordingly, when the LED light emitting unit includes the first LED group alone, the forward voltage level Vf of the LED light emitting unit is the first forward voltage level Vf1, and when the LED light emitting unit includes the first LED group and the second LED group, the forward voltage level Vf of the LED light emitting unit is the second forward voltage level Vf2, and likewise, when the LED light emitting unit includes the first to nth LED groups, the forward voltage level Vf of the LED light emitting unit is the nth forward voltage level Vfn.

Further, the term "first drive voltage" means an input voltage or a drive voltage obtained from the input voltage processed through a certain device (for example, through a rectification circuit) and primarily supplied to LED groups. Further, the term "second drive voltage" means a drive voltage obtained from the input voltage stored in an energy storage device and secondarily supplied from the energy storage device to the LED groups. By way of example, such a second drive voltage may be a drive voltage obtained from the input voltage stored in a capacitor and then supplied from the charged capacitor to the LED groups. Accordingly, unless specifically referred to as "first drive voltage" or "second drive voltage", the term "drive voltage" generally includes the first drive voltage and/or the second drive voltage supplied to the LED groups.

Further, the term "compensation interval" means an interval in which the level of an input voltage (rectified voltage) is less than a forward voltage level of the LED light emitting unit and drive current is not supplied to an LED group. For example, a first forward voltage level Vf1 compensation interval means an interval in which the voltage level of the rectified voltage is less than Vf1. In this case, the compensation interval becomes a non-luminous interval. Further, the term "first forward voltage level Vf1 compensation" means an operation of supplying the second drive voltage to the LED group to supply drive current to the LED group in the first forward voltage level Vf1 compensation interval. Thus, the term "nth forward voltage level Vfn compensation" means an operation of supplying the second drive voltage to the LED group in the nth forward voltage level Vfn compensation interval.

Further, the term "non-compensation interval" (or "normal operation interval") is an interval in which the level of an input voltage (rectified voltage) is higher than or equal to a preset forward voltage level and the input voltage (first drive voltage) is supplied to LED group(s) to allow the LED group(s) to emit light. By way of example, in an embodiment wherein first forward voltage level Vf1 compensation is performed, "non-compensation interval" (or "normal operation interval") means that the level of the input voltage is higher than or equal to Vf1, and in an embodiment wherein second forward voltage level Vf2 compensation is performed, "non-compensation interval" (or "normal operation interval") means that the level of the input voltage is higher than or equal to Vf2. Thus, in an embodiment wherein nth forward voltage level (Vfn) compensation is performed, "non-compensation interval" (or "normal operation interval") means that the level of the input voltage is higher than or equal to Vfn.

Further, the term "additional discharge interval" means an interval in which a charge/discharge unit supplying the second drive voltage to the LED drive controller is additionally discharged in the non-compensation interval instead of in the compensation interval under control of the LED drive controller.

Further, as used herein, V1, V2, V3, . . . , t1, t2, . . . , T1, T2, T3, and the like used to indicate certain voltages, certain time points, certain temperatures, and the like are relative values for differentiation from one another rather than absolute values.

Configuration and Function of First Exemplary Embodiment of LED Lighting Device 1000

First, the overall technical features of the LED lighting device 1000 according to the first exemplary embodiment will be described. As described above, in a conventional sequential driving type AC LED lighting device, since LED groups are sequentially turned on or off according to the voltage level of a drive voltage supplied to an LED light emitting unit 20, a non-luminous interval in which no LED group emits light is generated in an interval in which the voltage level of the drive voltage is less than the first forward voltage level Vf1. Moreover, in the conventional sequential driving type AC LED lighting device, the number of LEDs turned on to emit light increases with increasing voltage level of the drive voltage supplied to the LED light emitting unit 20, and the number of LEDs turned on to emit light decreases with decreasing voltage level of the drive voltage supplied to the LED light emitting unit 20. Such a sequential driving type AC LED lighting device has a problem of poor flicker performance due to such characteristics thereof.

Therefore, the most fundamental goal of the present disclosure is to improve flicker performance of the LED lighting device 1000 by removing a non-light emitting interval, that is, a non-luminous interval, of the LED light emitting unit 400 of the LED lighting device 1000 during operation of the LED lighting device 1000. In order to perform such a function, the present disclosure suggests a loop-back type compensation unit and provides an LED light emitting device configured to remove the non-luminous interval by supplying the second drive voltage to the LED light emitting unit 400 through a loop-back compensation unit 300 in the non-luminous interval.

In addition, in the AC driving type LED lighting device 1000, a voltage input to the LED light emitting unit 400 (that is, rectified voltage Vrec) varies over time. As a result, in an interval in which the level of the rectified voltage Vrec is higher than or equal to the forward voltage level of the LED light emitting unit 400, the rest of the rectified voltage Vrec is not used, thereby causing a problem of deterioration in power efficiency of the LED lighting device 1000. This problem can occur in a structure wherein the LED lighting device 1000 is configured to perform compensation using a first charge/discharge unit 300, as described above. Thus, the present disclosure provides the LED lighting device 1000 configured to allow the first charge/discharge unit 300 to be additionally discharged in an additional discharge interval and supplies a drive voltage to other components of the LED lighting device 1000 using additional discharge current in order to improve power efficiency of the LED lighting device 1000.

Figure 4:
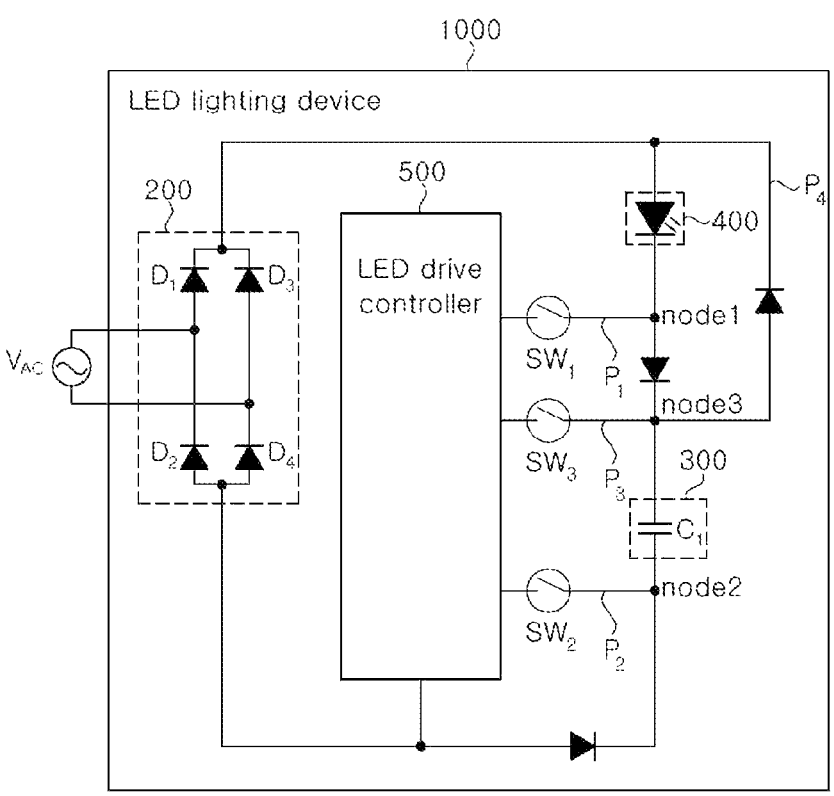
FIG. 4 is a schematic block diagram of an LED lighting device according to a first exemplary embodiment of the present disclosure.

FIG. 4 is a schematic block diagram of an LED lighting device with improved flicker performance (hereinafter, "LED lighting device") according to a first exemplary embodiment of the present disclosure. Hereinafter, the configuration and functions of the LED lighting device 1000 according to the first exemplary embodiment will be described in brief with reference to FIG. 4.

Referring to FIG. 4, the LED lighting device 1000 according to the first exemplary embodiment includes a rectification unit 200, a first charge/discharge unit 300, an LED light emitting unit 400, a first constant current switch SW1, a second constant current switch SW2, a third constant current switch SW3, and an LED drive controller 500. Among the components shown in FIG. 4, the rectification unit 200, the first charge/discharge unit 300, the LED light emitting unit 400, the first constant current switch SW1, the second constant current switch SW2, and the third constant current switch SW3 may constitute an LED drive circuit.

First, although the LED light emitting unit 400 may be composed of a plurality of LED groups, the LED light emitting unit 400 shown in FIG. 4 is illustrated as including a single LED group alone. However, it will be apparent to those skilled in the art that the number of LED groups included in the LED light emitting unit 400 can be changed, as needed, and that any LED light emitting unit including the subject matter of the present disclosure falls within the scope of the present disclosure. In exemplary embodiments wherein the LED light emitting unit 400 includes a plurality of LED groups, the plurality of LED groups included in the LED light emitting unit 400 may be sequentially turned on or off under control of the LED drive controller 500. In the followings, for convenience of description and understanding, the LED light emitting unit 400 will be illustrated as being composed of a single LED group, as shown in FIG. 4, without being limited thereto.

Further, in this exemplary embodiment, the LED light emitting unit 400 is designed to have a forward voltage level which allows LEDs to be driven by the second drive voltage supplied from the first charge/discharge unit 300 in the compensation interval and is thus kept in a turned-on state in the overall cycle of AC voltage VAC. When the LED light emitting unit 400 includes a plurality of LED groups as described above, for example, two LED groups, that is, a first LED group and a second LED group, the first charge/discharge unit 300 may be designed such that at least the first LED group is kept in a turned-on state in the overall cycle of AC voltage VAC.

Referring to FIG. 4, the rectification unit 200 according to this exemplary embodiment is configured to generate and output a rectified voltage Vrec by rectifying AC voltage VAC input from an external power source. As the rectification unit 200, any rectification circuit known in the art, such as a full-wave rectification circuit or a half-wave rectification circuit, may be used. The rectification unit 200 is configured to supply the rectified voltage Vrec to the first charge/discharge unit 300, the LED light emitting unit 400, and the LED drive controller 500. FIG. 4 shows a bridge full-wave rectification circuit composed of four diodes D1, D2, D3, D4.

The first charge/discharge unit 300 according to this exemplary embodiment is configured to be charged with energy using the rectified voltage Vrec in a charge interval, to supply the second drive voltage to the LED light emitting unit 400 in the compensation interval, and to be additionally discharged to supply a drive voltage to other components of the LED lighting device 1000 (for example, the LED drive controller 500, an external sensor (not shown), a wireless communication module (not shown), and an external control circuit (not shown)) in the additional discharge interval. In FIG. 4, a first capacitor C1 is shown as the first charge/discharge unit 300 according to this exemplary embodiment. However, it should be understood that other implementations are also possible and any one of various compensation circuits (for example, a valley-fill circuit and the like) known in the art may be used, as needed.

In addition, as shown in FIG. 4, the first charge/discharge unit 300 is connected at one end thereof to the LED drive controller 500 through the ground (not shown) and the second constant current switch SW2, and at the other end thereof to the LED drive controller 500 through an anode of the LED light emitting unit 400 and the third constant current switch SW3.

Further, in the exemplary embodiment of FIG. 4, the first charge/discharge unit 300 is configured to be charged in the charge interval (that is, an interval in which the voltage level of the rectified voltage Vrec is higher than or equal to a preset voltage level higher than or equal to the forward voltage level Vf of the LED light emitting unit 400) and to be discharged to supply the second drive voltage to the LED light emitting unit 400 in a non-luminous interval (that is, an interval in which the voltage level of the rectified voltage Vrec is less than the first forward voltage level Vf1). However, it should be understood that other implementations are also possible. In an exemplary embodiment wherein the LED light emitting unit 400 of the LED lighting device 1000 includes four LED groups composed of first to fourth LED groups, the first charge/discharge unit 300 may be charged in a fourth operation interval (that is, an interval in which the voltage level of the rectified voltage Vrec is higher than or equal to the fourth forward voltage level Vf4) Likewise, it should be noted that, in exemplary embodiments in which the LED light emitting unit 400 of the LED lighting device 1000 includes n LED groups composed of a first LED group to an nth LED group (not shown), the first charge/discharge unit 300 may be charged in an nth operation interval (that is, an interval in which the voltage level of the rectified voltage Vrec is higher than or equal to the nth forward voltage level Vfn).

Further, the first charge/discharge unit 300 according to this exemplary embodiment may be configured to be additionally discharged to supply a drive voltage to other components of the LED lighting device 1000 (for example, the LED drive controller 500, an external sensor (not shown), a wireless communication module (not shown), and an external control circuit (not shown)) under control of the LED drive controller 500 in the additional discharge interval. Such an additional discharge interval may be set in various ways as needed. In one exemplary embodiment, the additional discharge interval may be set to an interval in which the voltage level of the rectified voltage Vrec is higher than or equal to the forward voltage level Vf of the LED light emitting unit 400 and is less than the voltage level of the first charge/discharge unit 300, among intervals in which an input voltage, that is, the rectified voltage Vrec, increases. This setting allows the LED lighting device 1000 to be stably driven. That is, when the additional discharge interval is set among intervals in which the rectified voltage Vrec decreases, there can be a problem in that the second drive voltage cannot be stably supplied to the LED light emitting unit 400 in the compensation interval. Accordingly, in this exemplary embodiment, the additional discharge interval is set to an interval in which a particular condition is satisfied, among the intervals in which the rectified voltage Vrec increases. In addition, since the interval in which the voltage level of the rectified voltage Vrec is less than the forward voltage level Vf of the LED light emitting unit 400 is the compensation interval, this interval is excluded from the additional discharge interval, and since the interval in which the voltage level of the rectified voltage Vrec is higher than or equal to the voltage level of the first charge/discharge unit 300 can pertain to the charge interval, this level can also be removed from the additional discharge interval.

The LED drive controller 500 according to this exemplary embodiment is configured to control operation of the LED light emitting unit 400 and the first charge/discharge unit 300 by controlling the first to third constant current switches SW1 to SW3 based on the voltage level of the rectified voltage Vrec applied to the LED lighting device 1000.

Referring to FIG. 4, in this exemplary embodiment, the first constant current switch SW1 may be disposed between a first node (node 1) between a cathode of the LED light emitting unit 400 and the first charge/discharge unit 300 and the LED drive controller 500, and may be configured to selectively form a first current path P1 under control of the LED drive controller 500. In addition, as shown in FIG. 4, in this exemplary embodiment, the second constant current switch SW2 may be disposed between a second node (node 2) between the first charge/discharge unit 300 and the ground and the LED drive controller 500, and may be configured to selectively form a second current path P2 under control of the LED drive controller 500. Further, as shown in FIG. 4, in this exemplary embodiment, the third constant current switch SW3 may be disposed between a third node (node3) between the first node (node1) and the first charge/discharge unit 300 and the LED drive controller 500, and may be configured to selectively form a third current path P3 under control of the LED drive controller 500.

Accordingly, the LED drive controller 500 according to this exemplary embodiment controls the first to third constant current switches SW1 to SW3 such that the first charge/discharge unit 300 can supply the second drive voltage to the LED light emitting unit 400 through the fourth current path P4 in the compensation interval, can be additionally discharged through the third current path P3 in the additional discharge interval, and can be charged using the rectified voltage Vrec through the second current path P2 in the charge interval.

On the other hand, in this exemplary embodiment, since the additional discharge interval is set to a particular interval among the intervals in which the rectified voltage Vrec increases, the LED drive controller 500 is configured to determine whether the rectified voltage Vrec currently input from the rectification unit pertains to the rectified voltage increase interval or the rectified voltage decrease interval. In order to perform such a function, the LED drive controller 500 according to this exemplary embodiment may include a zero-crossing detection function, or may be configured to determine the increase interval or the decrease interval by detecting variation in inclination of the rectified voltage Vrec measured in a predetermined period of time. Such a function is well known in the art and thus a detailed description thereof will be omitted.

Further, the LED drive controller 500 according to this exemplary embodiment may control the first to third constant current switch SW1 to SW3 to allow a first current I1 and a fourth current I4 flowing through the first constant current switch SW1, a second current I2 flowing through the second constant current switch SW2, and a third current I3 flowing through the third constant current switch SW3 to realize preset constant current values, respectively. In the present disclosure, the first to third constant current switches SW1 to SW3 may be realized using various techniques known in the art. For example, with regard to the constant current control function as described above, each of the first to third constant current switches SW1 to SW3 according to this exemplary embodiment may include a sensing resistor for current detection, a differential amplifier for comparing a currently detected current value with a reference current value, and a switching element configured to control connection of a path depending upon output from the differential amplifier and to control an LED drive current flowing through the path to a constant current value when the path is connected. In addition, for example, switching elements constituting the first to third constant current switches SW1 to SW3 according to the exemplary embodiment may be realized using one of a metal oxide semiconductor field effect transistor (MOSFET), an insulated gate bipolar transistor (IGBT), a bipolar junction transistor (BJT), a junction type field effect transistor (JFET), a thyristor (silicon controlled rectifier), and a triac.

Next, referring to FIG. 5A to FIG. 5D and FIG. 6, operation control of the LED lighting device 1000 according to the first exemplary embodiment will be described in more detail. FIG. 5A to FIG. 5D are block diagrams showing switch control states in operation intervals and LED drive current of the LED lighting device shown in FIG. 4, and FIG. 6 shows waveform diagrams depicting time-related variation in rectified voltage, LED drive current, charge/discharge unit current, input current, and light output from an LED light emitting unit of the LED lighting device shown in FIG. 4.

Figure 5A:
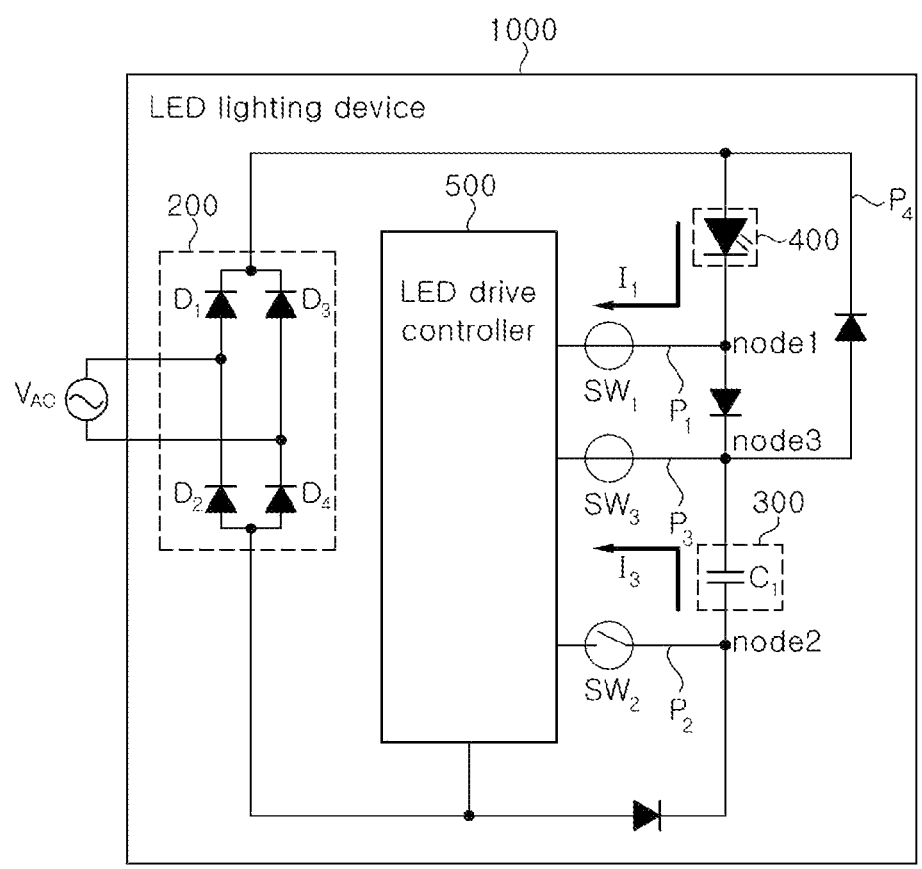
FIG. 5A, FIG. 5B, FIG. 5C, FIG. 5D and FIG. 5E are block diagrams showing switch control states in operation intervals and LED drive current of the LED lighting device shown in FIG. 4.
Figure 6:
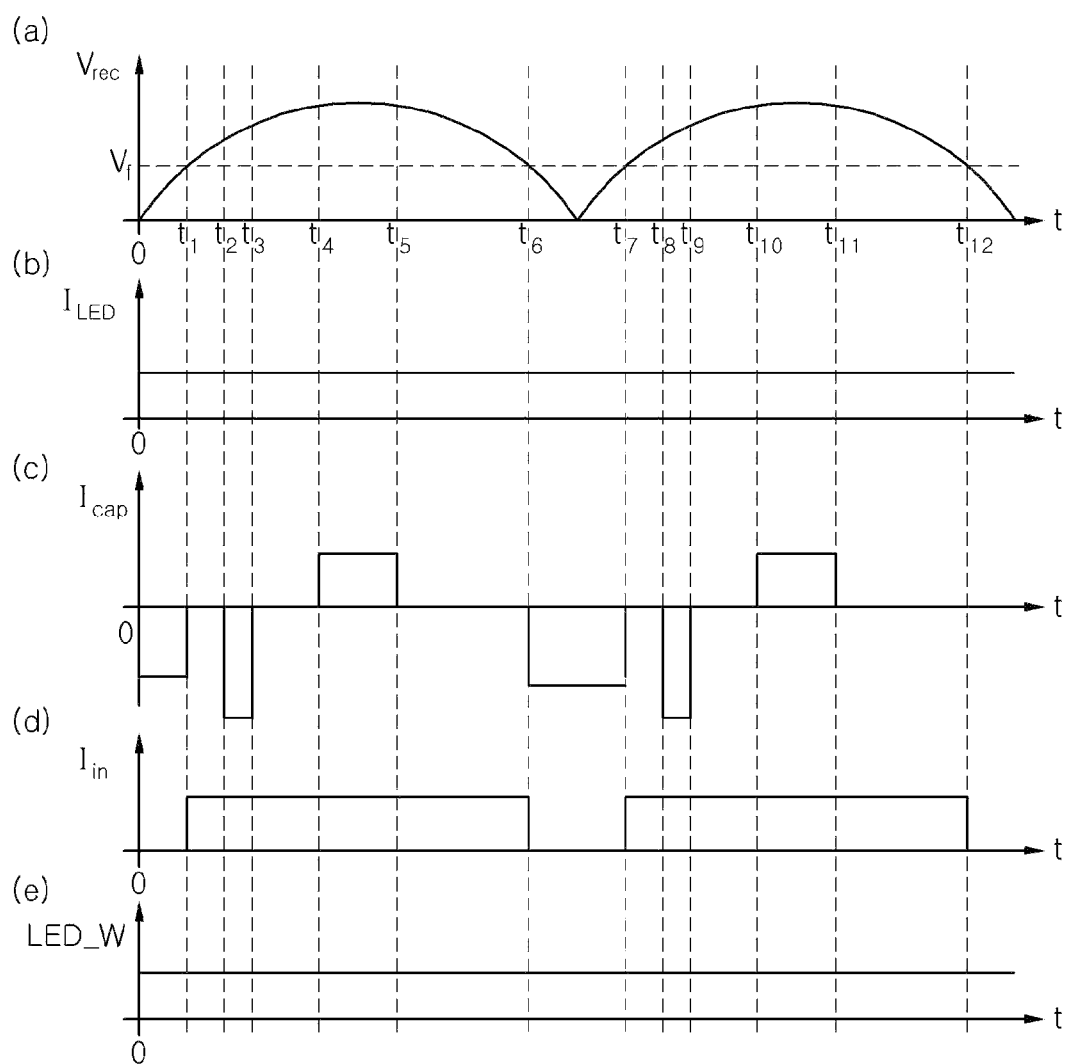
FIG. 6 shows waveform diagrams depicting time-related variation in rectified voltage, LED drive current, charge/discharge unit current, input current, and light output from an LED light emitting unit of the LED lighting device shown in FIG. 4.

First, FIG. 5A shows a relationship between switch control states of the first to third constant current switches SW1 to SW3 and current flowing through the LED lighting device 1000 in the additional discharge interval. In this exemplary embodiment, the additional discharge interval is the interval in which the voltage level of the rectified voltage Vrec is higher than or equal to the forward voltage level Vf of the LED light emitting unit 400 and is less than the voltage level of the first charge/discharge unit 300, among the intervals in which the input voltage, that is, the rectified voltage Vrec, increases. Thus, referring to FIG. 6, the additional discharge interval includes time intervals t2 to t3 and time intervals t8 to t9.

The LED drive controller 500 is configured to determine entrance/departure with respect to the additional discharge interval based on the voltage level of the rectified voltage Vrec and to control the first to third constant current switches SW1, SW3 based on the determination results. More specifically, at a time point of entering the additional discharge interval, that is, when the voltage level of the rectified voltage Vrec pertains to the voltage increase interval and thus is higher than or equal to the forward voltage level of the LED light emitting unit 400, the LED drive controller 500 controls the first constant current switch SW1 and the third constant current switch SW3 to be closed to form the first current path P1 and the third current path P3, respectively, while allowing the second constant current switch SW2 to be open. Such a switch control state is shown in FIG. 5A.

More preferably, in order to secure stable operation of the LED lighting device 1000, the LED drive controller 500 according to this exemplary embodiment may be configured to determine a time point when the voltage level of the rectified voltage Vrec is stabilized and is higher than or equal to the forward voltage level Vf of the LED light emitting unit 400 as the time point of entering the additional discharge interval. That is, in one exemplary embodiment, the LED drive controller 500 may be configured to determine, as a switch control time point, a time point (for example, a time point t2 of FIG. 6) when a certain period of time for stabilization elapses from a time point (for example, a time point t1 of FIG. 6) when the voltage level of the rectified voltage Vrec reaches the forward voltage level Vf of the LED light emitting unit 400, instead of determining the time point t1 as the switch control time point. In an alternative exemplary embodiment, the LED drive controller 500 may be configured to determine a time point when the first current I1 flowing through the first constant current switch SW1 is stabilized as the time point of entering the additional discharge interval. In another alternative exemplary embodiment, the LED drive controller 500 may be configured to determine a time point when the voltage level of the rectified voltage Vrec reaches a first critical voltage level (here, the first critical voltage level is set to be higher than the forward voltage level Vf of the LED light emitting unit 400) as the time point of entering the additional discharge interval. In the additional discharge interval as shown in FIG. 5A, the LED drive current, that is, the first current I1, flows through the first current path P1, and an additional discharge current, that is, the third current I3, flows through the third current path P3. Here, the LED drive controller 500 controls the first current I1 and the third current I3 to realize preset constant current values, respectively.

On the other hand, in the additional discharge interval, the additional discharge current discharged from the first charge/discharge unit 300 may be supplied to components inside and/or outside the LED drive controller 500 through the LED drive controller 500. This feature will be described below with reference to FIG. 9 and FIG. 10.

Figure 5B:
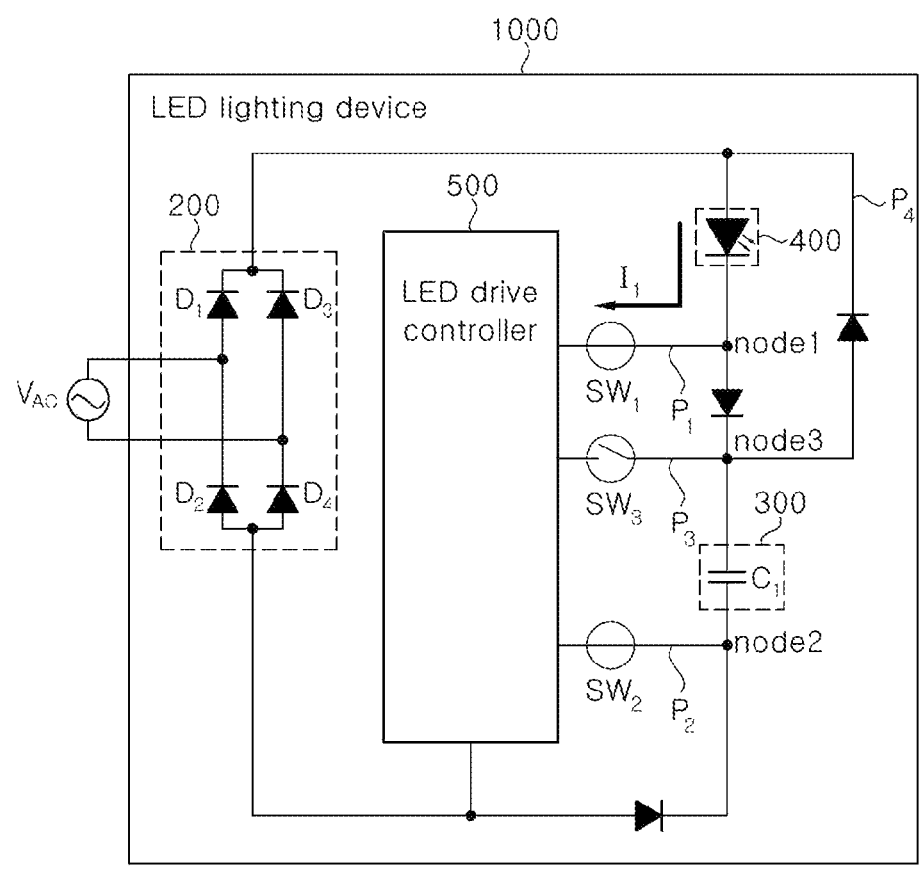

Then, at a time point (for example, time point t3 of FIG. 6) when the voltage level of the rectified voltage Vrec increases and reaches a voltage level higher than or equal to the voltage level of the first charge/discharge unit 300, the LED drive controller 500 controls the third constant current switch SW3 to be open in order to stop additional discharge of the first charge/discharge unit 300. Such a control state is shown in FIG. 5B. In the state shown in FIG. 5B, the LED drive controller 500 may control the first current I1 flowing through the first current path P1 to realize a preset constant current value.

Figure 5C:
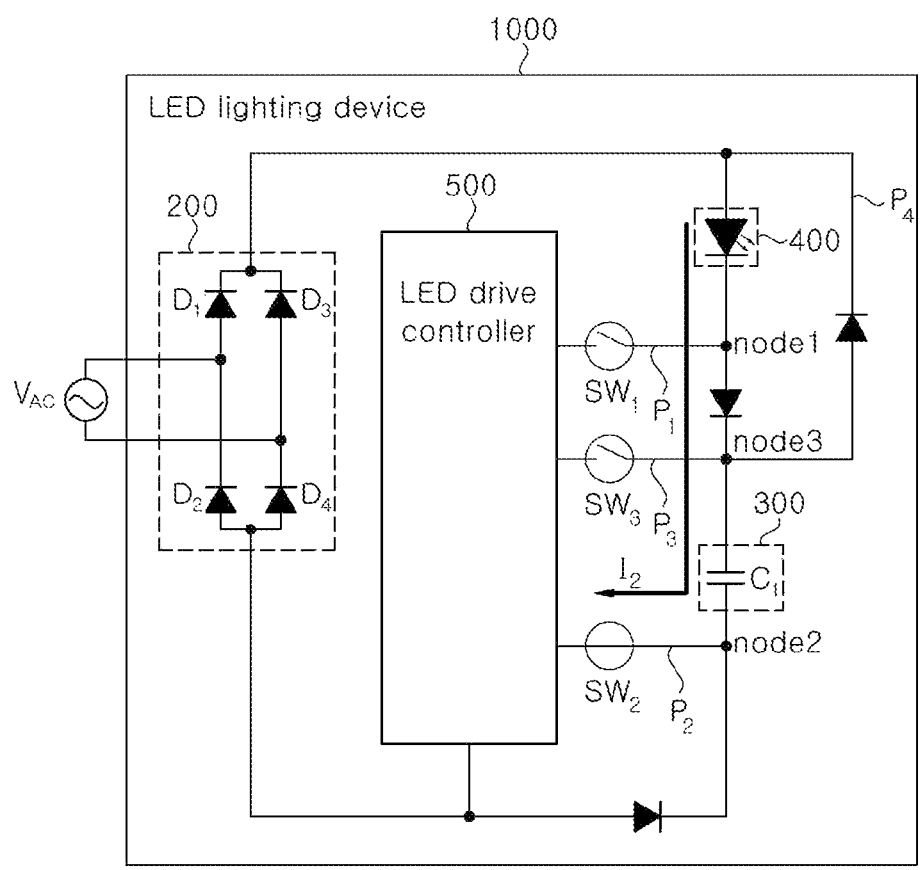

Thereafter, at a time point (for example, time point t4 of FIG. 6) when the voltage level of the rectified voltage Vrec increases and reaches a voltage level pertaining to the charge interval, the LED drive controller 500 enters the charge interval by opening the first constant current switch SW1 while closing the second constant current switch SW2, as shown in FIG. 5C. In the state shown in FIG. 5C, the LED drive controller 500 can control the second current I2 flowing through the second constant current switch SW2 to realize a preset constant current value. In the state shown in FIG. 5C, the second current I2 is the LED drive current and acts as a charge current of the first charge/discharge unit 300.

Figure 5D:
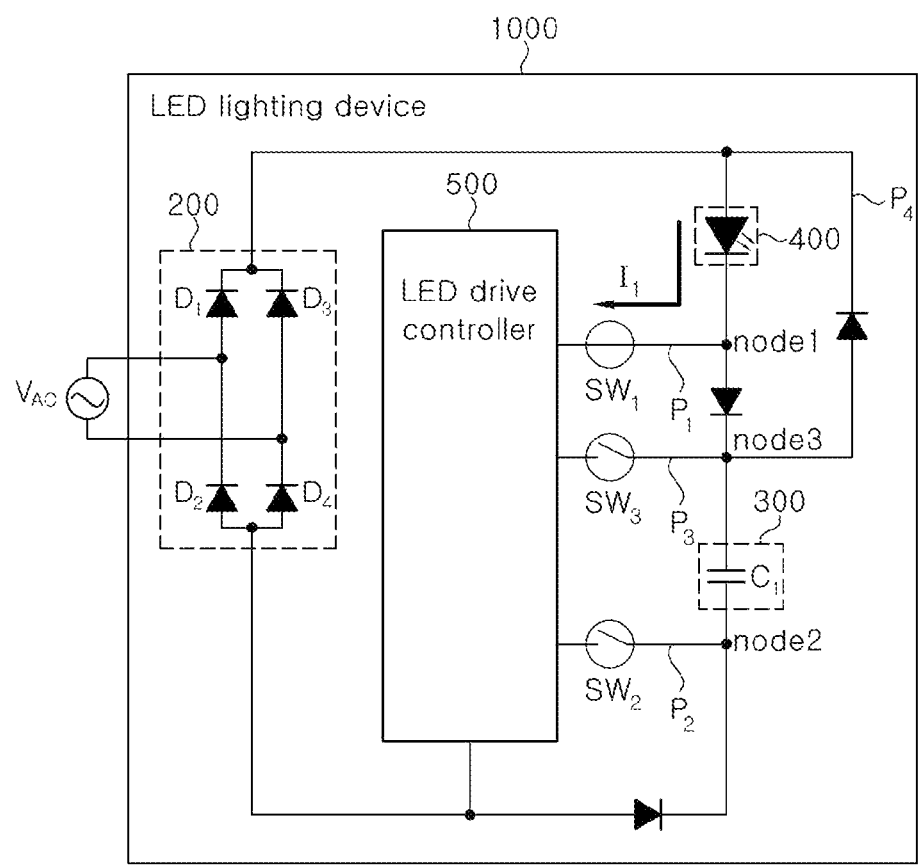

At a time point (for example, time point t5 of FIG. 6) when the voltage level of the rectified voltage Vrec decreases from the highest voltage level and reaches a voltage level less than the voltage level pertaining to the charge interval after the voltage level of the rectified voltage Vrec reaches the highest voltage level, the LED drive controller 500 departs from the charge interval by opening the second constant current switch SW2 while closing the first constant current switch SW1, as shown in FIG. 5D. As described above, since the additional discharge interval pertains to some intervals among the increase interval of the rectified voltage Vrec, the additional discharge interval is not present in the decrease interval of the rectified voltage Vrec, as shown in FIG. 6. In the state shown in FIG. 5D, the LED drive controller 500 controls the first current I1 flowing through the first constant current switch SW1 to realize a preset constant current value.

On the other hand, in one exemplary embodiment, the LED drive controller 500 may be configured to determine the time point of entering the charge interval and the time point of departing from the charge interval as described above by monitoring the second current I2 flowing through the second constant current switch SW2. For example, the LED drive controller 500 may be configured to determine a time point when the second current I2 is stabilized to realize a preset constant current value or more as the time point of entering the charge interval, and to determine a time point when the second current I2 decreases to a preset constant current value or less as the time point of departing from the charge interval. In an alternative exemplary embodiment, the LED drive controller 500 may be configured to determine the time point of entering the charge interval and the time point of departing from the charge interval as described above by monitoring the voltage level of the rectified voltage Vrec. For example, the LED drive controller 500 may be configured to determine a time point when the voltage level of the rectified voltage Vrec is stabilized to reach a preset second critical voltage level (here, the second critical voltage level is set to be higher than or equal to the forward voltage level of the LED light emitting unit 400 and the voltage level of the first charge/discharge unit 300) as the time point of entering the charge interval, and to determine a time point when the voltage level of the rectified voltage Vrec decreases to the preset second critical voltage level or less as the time point of departing from the charge interval. Alternatively, various techniques apparent to those skilled in the art can be used in order to determine entrance/departure with respect to the charge interval.

Figure 5E:
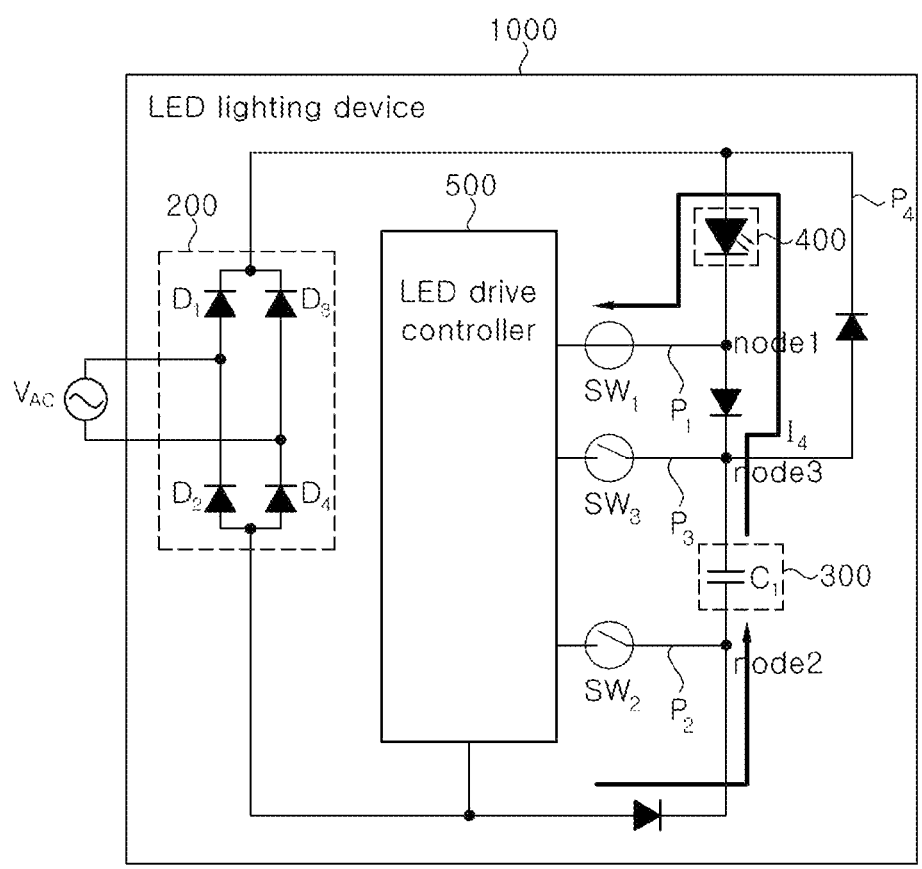

Then, when the voltage level of the rectified voltage Vrec becomes less than the forward voltage level Vf of the LED light emitting unit 400, the LED drive controller 500 determines that the LED light emitting unit has entered the compensation interval. In this case, as shown in FIG. 5E, separate control may not be carried out in the switch control state shown in FIG. 5D. That is, as in FIG. 5D, in the compensation interval, the first constant current switch SW1 can be kept in a closed state, and the second constant current switch SW2 and the third constant current switch SW3 can be kept in an open state. Here, since the voltage level of the first charge/discharge unit 300 is higher than the voltage level of the rectified voltage Vrec, the fourth current I4 (that is, discharge current) is supplied from the first charge/discharge unit 300 to the LED light emitting unit 400 through the fourth current path P4 due to a potential difference without separate switch control. Thus, the LED light emitting unit 400 continues to emit light.

Such control procedures described above are periodically repeated in each cycle of the rectified voltage Vrec. Referring to FIG. 6, these procedures will be briefly summarized. FIG. 6 shows waveforms in two cycles of the rectified voltage Vrec in a charged state of the first charge/discharge unit 300 of the LED lighting device 1000. Specifically, in FIG. 6, (a) shows a waveform of the rectified voltage Vrec over time, (b) shows a waveform of the LED drive current, (c) shows a waveform of charge/discharge current of the first charge/discharge unit 300, (d) shows a waveform of an input current, and (e) shows a waveform of light output of the LED light emitting unit 400.

First, in an interval in which the voltage level of the rectified voltage Vrec is less than the forward voltage level of the LED light emitting unit 400, that is, in a discharge interval (time interval from 0 to t1), the LED drive controller 500 controls the switches to realize the states shown in FIG. 5E. That is, in the discharge interval, the first constant current switch SW1 is kept in a closed state, and the second constant current switch SW2 and the third constant current switch SW3 are kept in an open state.

Thereafter, at the time point t1 when the voltage level of the rectified voltage Vrec increases and reaches the forward voltage level Vf of the LED light emitting unit 400, the LED drive controller 500 determines that the LED light emitting unit 400 has entered the non-compensation interval and controls the switches to realize the states shown in FIG. 5B, respectively. That is, in this interval, the first constant current switch SW1 and the second constant current switch SW2 are kept in a closed state and the third constant current switch SW3 is kept in an open state.

Thereafter, at the time point t2 when the voltage level of the rectified voltage Vrec increases and reaches the first critical voltage level, the LED drive controller 500 determines that the LED light emitting unit 400 has entered the additional discharge interval and controls the switches to realize the states shown in FIG. 5A, respectively. That is, in the additional discharge interval, the first constant current switch SW1 and the third constant current switch SW3 are kept in a closed state and the second constant current switch SW2 is kept in an open state. Accordingly, in such an additional discharge interval, the first current I1 (that is, LED drive current) flowing through the first constant current switch SW1 is controlled to realize a preset constant current value through the first constant current switch SW1, and the third current I3 (that is, additional discharge current) flowing through the third constant current switch SW3 is controlled to realize a preset constant current value through the third constant current switch SW3.

Thereafter, at the time point t3 when the voltage level of the rectified voltage Vrec increases and reaches a voltage level higher than or equal to the voltage level of the first charge/discharge unit 300, the LED drive controller 500 determines that the LED light emitting unit has departed from the additional discharge interval and controls the switches to realize the states shown in FIG. 5B, respectively. That is, in this interval, the first constant current switch SW1 and the second constant current switch SW2 are kept in a closed state and the third constant current switch SW3 is kept in an open state. In one exemplary embodiment, the LED drive controller 500 may be configured to determine that the LED light emitting unit departs from the additional discharge interval by monitoring the third current I3 flowing through the third constant current switch SW3. That is, when the voltage level of the rectified voltage Vrec increases and reaches a voltage level higher than or equal to the voltage level of the first charge/discharge unit 300, the third current I3 does not flow through the third constant current switch SW3 due to a potential difference. Thus, the LED drive controller 500 may be configured to determine a time point when the third current I3 decreases to a preset critical value or less as the time point of departing from the additional discharge interval. In another exemplary embodiment, the LED drive controller 500 may be configured to determine that the LED light emitting unit departs from the additional discharge interval through detection and comparison of the voltage level of the rectified voltage Vrec with a preset voltage level of the first charge/discharge unit 300.

Similarly, at the time point t4 when the voltage level of the rectified voltage Vrec increases and reaches a voltage level pertaining to the charge interval, the LED drive controller 500 determines that the LED light emitting unit has entered the charge interval and controls the switches to realize the states shown in FIG. 5C, respectively. That is, in this interval, the first constant current switch SW1 and the third constant current switch SW3 are kept in a closed state and the second constant current switch SW2 is kept in an open state. Accordingly, in the charge interval, the LED drive controller 500 controls the second current I2 flowing through the second constant current switch SW2 to realize a preset constant current value. On the other hand, in one exemplary embodiment, the LED drive controller 500 may be configured to determine whether the LED light emitting unit enters or departs from the charge interval through detection and comparison of the voltage level of the rectified voltage Vrec with the preset second critical voltage level, as described above. In another exemplary embodiment, the LED drive controller 500 may be configured to determine whether the LED light emitting unit enters or departs from the charge interval by monitoring the second current I2 flowing through the second constant current switch SW2. For example, when the second current I2 flowing through the second constant current switch SW2 is stabilized to a preset current value or more, the LED drive controller may determine that the voltage level of the rectified voltage Vrec is sufficient to enter the charge interval. Similarly, the LED drive controller may be configured to determine that the LED light emitting unit has departed from the charge interval when the second current I2 flowing through the second constant current switch SW2 decreases to a preset current value or less after entrance into the charge interval.

Thereafter, at the time point t5 when the voltage level of the rectified voltage Vrec decreases from the highest voltage level and reaches a voltage level less than the voltage level pertaining to the charge interval, the LED drive controller 500 determines that the LED light emitting unit has departed from the charge interval and controls the switches to realize the states shown in FIG. 5D, respectively. That is, in this interval, the first constant current switch SW1 is kept in an open state, and the second constant current switch SW2 and the third constant current switch SW3 are kept in a closed state. Further, in this interval, the LED drive controller 500 controls the first current I1 flowing through the first constant current switch SW1 to realize a preset constant current value. On the other hand, as described above, departure from the charge interval can be determined by directly detecting and comparing the voltage level of the rectified voltage Vrec with the voltage level of the second critical voltage level, or by monitoring the voltage value of the second current I2.

Then, at the time point t6 when the voltage level of the rectified voltage Vrec decreases to a voltage level less than the forward voltage level Vf of the LED light emitting unit 400, the LED drive controller determines that the LED light emitting unit has entered the compensation interval and controls the switches to realize the states shown in FIG. 5E, respectively. As described above, at this time point, the second drive voltage can be naturally supplied to the LED light emitting unit 400 through the fourth current path P4 by a potential difference between the rectified voltage Vrec and the first charge/discharge unit 300 without separate switch control.

On the other hand, as can be seen from FIG. 6 (b) and FIG. 6 (e), the LED drive current is kept constant over the entire interval of the rectified voltage Vrec, thereby maintaining constant light output of the LED light emitting unit 400.

Such control procedures described above are periodically repeated in each cycle of the rectified voltage Vrec, whereby the LED light emitting unit 400 can continue to emit light while allowing the first charge/discharge unit 300 to be additionally discharged in the additional discharge interval to supply a drive voltage to other components of the LED lighting device 1000, thereby improving power efficiency of the LED lighting device 1000.

Hereinafter, the configurations and functions of LED lighting devices according to other exemplary embodiments of the present disclosure will be described with reference to FIG. 7 to FIG. 10. In the followings, the same components and functions of the LED lighting devices according to the following exemplary embodiments as those of the LED lighting device 1000 according to the first exemplary embodiment will be described with reference to the description of the LED lighting device 1000 shown in FIG. 4 to FIG. 6 and the following description will focus on the features of the following exemplary embodiments different from those of the first exemplary embodiment.

Figure 7:
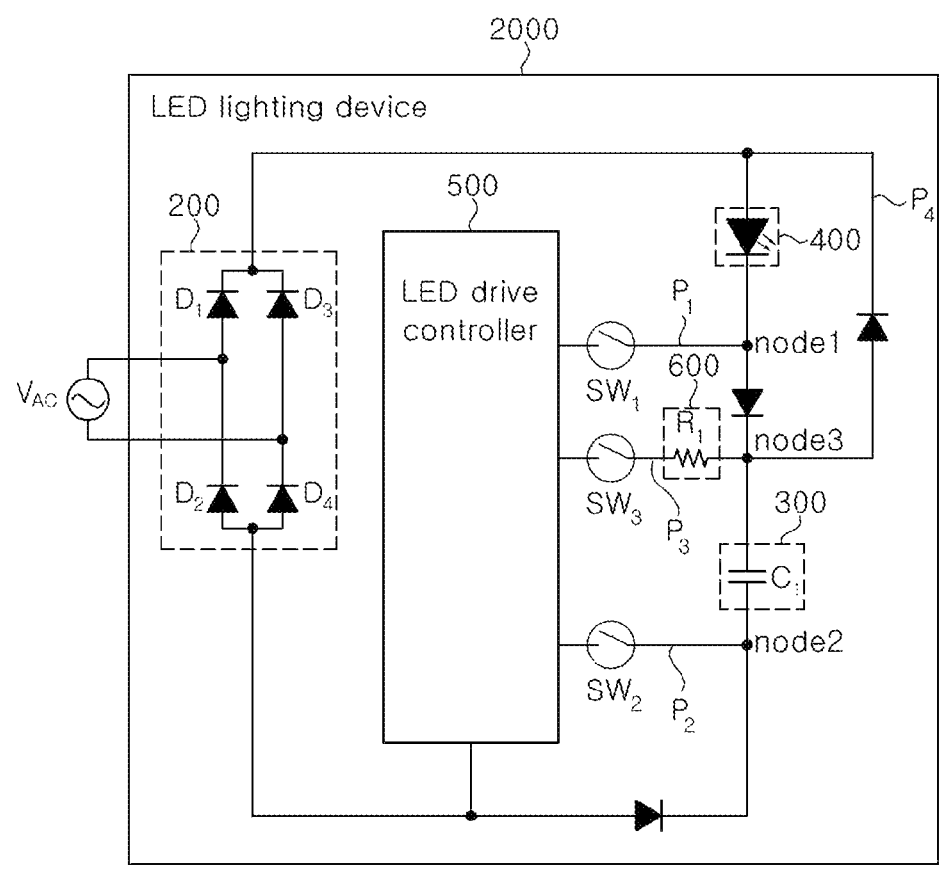
FIG. 7 is a schematic block diagram of an LED lighting device according to a second exemplary embodiment of the present disclosure.

Configuration and Function of LED Lighting Device 2000 According to Second Exemplary Embodiment FIG. 7 is a schematic block diagram of an LED lighting device according to a second exemplary embodiment of the present disclosure. Referring to FIG. 7, the LED lighting device 2000 according to the second exemplary embodiment further includes a current restriction unit 600 disposed between the third node (node3) and the third constant current switch SW3 in addition to the components of the LED lighting device 1000 according to the first exemplary embodiment. The current restriction unit 600 is configured to perform a function of restricting the third current I3 when the third constant current switch SW3 is turned on to allow the third current I3 to flow through the third current path in the additional discharge interval. Such a current restriction unit 600 serves to protect the third constant current switch SW3 from overcurrent, surge current, and the like.

In the exemplary embodiment shown in FIG. 7, the current restriction unit 600 is realized by a resistor R1. However, it should be understood that other implementations are also possible. Alternatively or additionally, a capacitor, an inductor, an additional resistor and/or combinations thereof can be used in various ways, as needed.

Figure 8:
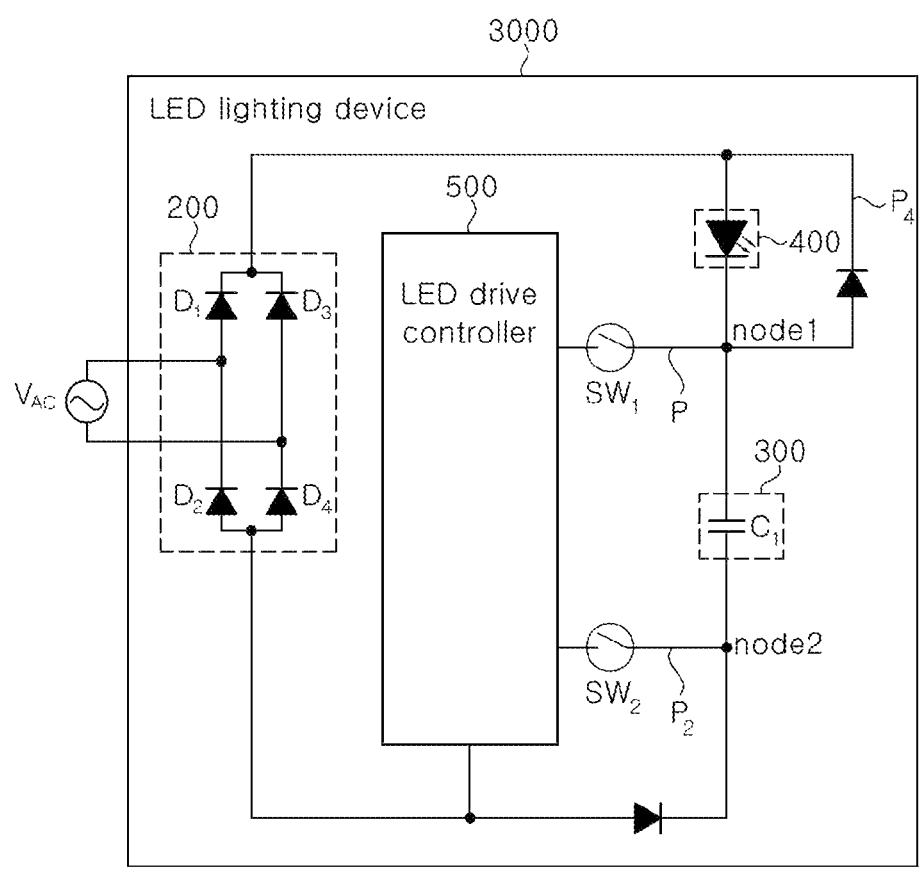
FIG. 8 is a schematic block diagram of an LED lighting device according to a third exemplary embodiment of the present disclosure.

Configuration and Function of LED Lighting Device 3000 According to Third Exemplary Embodiment FIG. 8 is a schematic block diagram of an LED lighting device according to a third exemplary embodiment of the present disclosure. Referring to FIG. 8, the LED lighting device 3000 according to the third exemplary embodiment does not include the third constant current switch SW3 unlike the LED lighting device 1000 according to the first exemplary embodiment. In the LED lighting device 3000 according to the third exemplary embodiment, the first constant current switch SW1 is configured to perform the function of the third constant current switch SW3 of the LED lighting device 1000 according to the first exemplary embodiment. That is, in the additional discharge interval, the additional discharge current from the first charge/discharge unit 300 flows together with the LED drive current (that is, input current from the rectification unit 200) through the first constant current switch SW1. As compared with the LED lighting device 1000 according to the first exemplary embodiment, the LED lighting device 3000 according to the third exemplary embodiment has advantages such as reduction in manufacturing costs and simplification of circuit configuration through reduction in the number of circuit components, despite deterioration in stability of the LED drive circuit.

Figure 9:
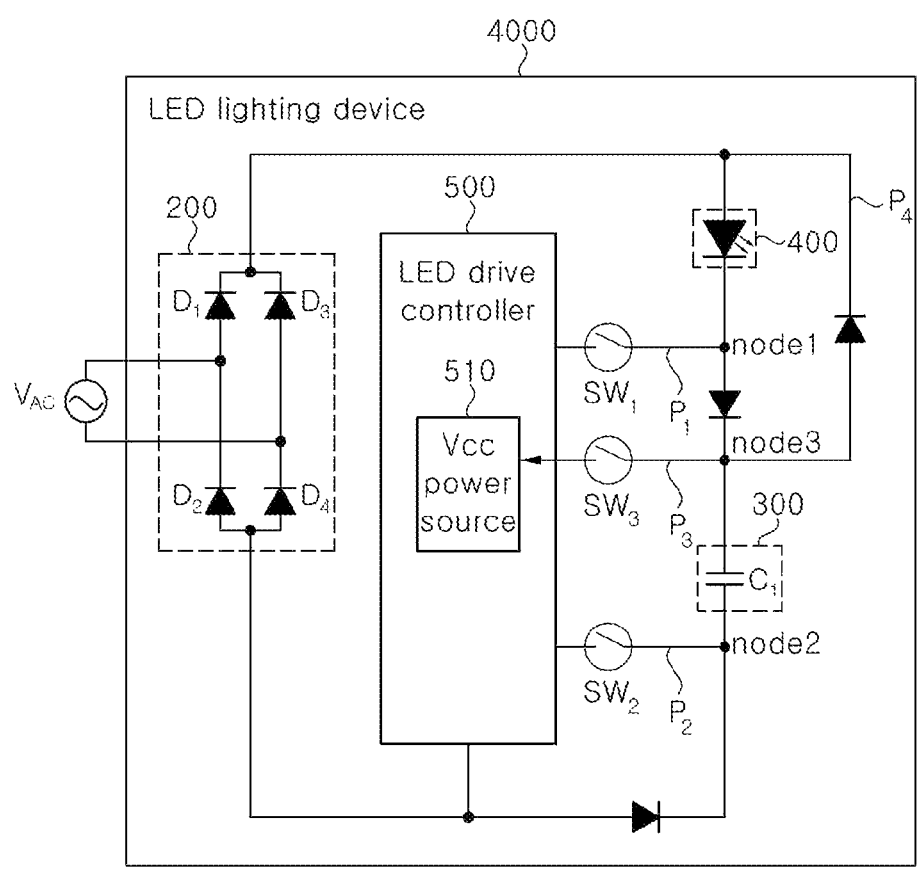
FIG. 9 is a schematic block diagram of an LED lighting device according to a fourth exemplary embodiment of the present disclosure.

Configuration and Function of LED Lighting Device 4000 According to Fourth Exemplary Embodiment FIG. 9 is a schematic block diagram of an LED lighting device according to a fourth exemplary embodiment of the present disclosure. Referring to FIG. 9, the LED lighting device 4000 according to the fourth exemplary embodiment may further include a Vcc power source 510 in the LED drive controller 500. Specifically, the LED drive circuit of the LED lighting device 4000 according to the fourth exemplary embodiment has the same configuration and function as the LED drive circuit of the LED lighting device 1000 according to the first exemplary embodiment except that the LED lighting device 4000 allows the additional discharge current (that is, the third current I3) discharged from the first charge/discharge unit 300 in the additional discharge interval to be supplied to the Vcc power source 510 provided as an internal power source of the LED drive controller 500. In FIG. 9, the Vcc power source 510 inside the LED drive controller 500 is shown as a component to which the drive voltage is supplied through additional discharge of the first charge/discharge unit 300. However, it should be understood that other implementations are also possible. Alternatively or additionally, the LED lighting device 4000 may be configured to supply the drive voltage to various other components therein, such as an external sensor, a wireless communication module, an external control circuit, and the like, through additional discharge of the first charge/discharge unit 300.

Figure 10:
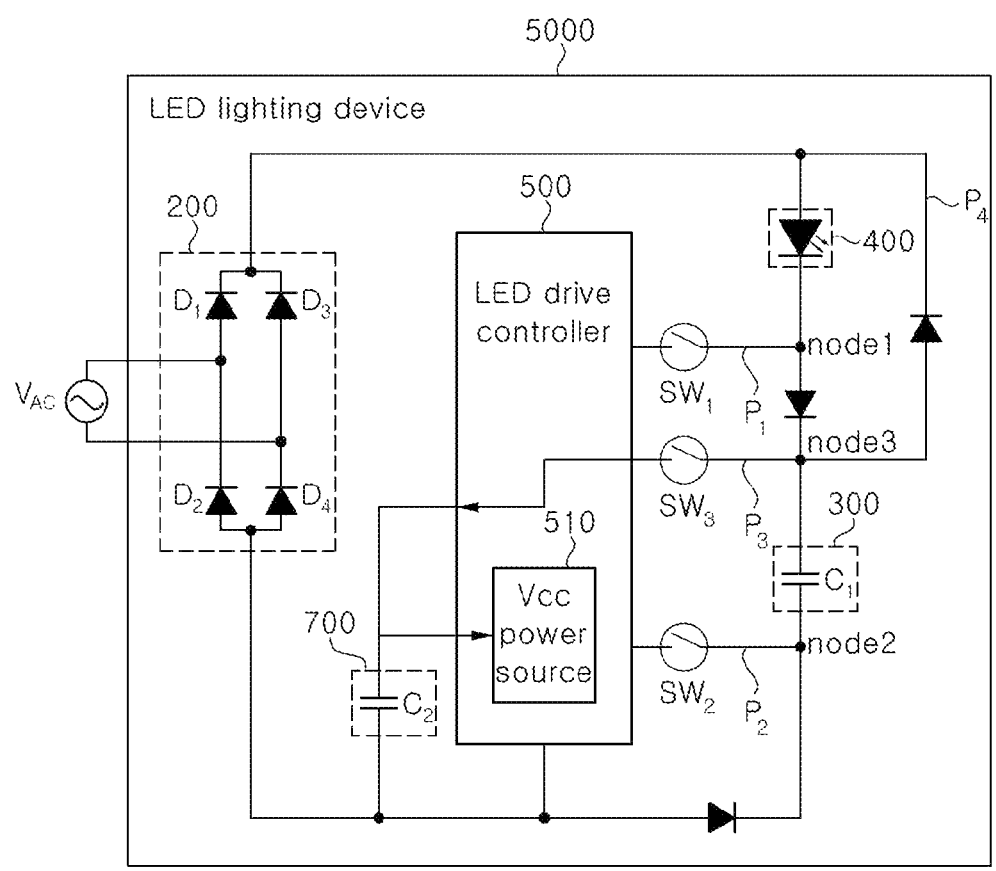
FIG. 10 is a schematic block diagram of an LED lighting device according to a fifth exemplary embodiment of the present disclosure.

Configuration and Function of LED Lighting Device 5000 According to Fifth Exemplary Embodiment FIG. 10 is a schematic block diagram of an LED lighting device according to a fifth exemplary embodiment of the present disclosure. Referring to FIG. 10, the LED lighting device 5000 according to the fifth exemplary embodiment may further include a Vcc power source 510 and a second charge/discharge unit 700 inside the LED drive controller 500. Specifically, the LED drive circuit of the LED lighting device 5000 according to the fifth exemplary embodiment has the same configuration and function as the LED drive circuit of the LED lighting device 1000 according to the first exemplary embodiment except that the LED lighting device 5000 allows the second charge/discharge unit 700 to be charged with the additional discharge current (that is, the third current I3) discharged from the first charge/discharge unit 300 in the additional discharge interval such that the second charge/discharge unit 700 can stably supply the drive voltage to the Vcc power source 510 provided as an internal power source of the LED drive controller 500. In FIG. 10, the Vcc power source 510 inside the LED drive controller 500 is shown as a component to which the drive voltage is supplied from the second charge/discharge unit 700. However, it should be understood that other implementations are also possible. Alternatively or additionally, the LED lighting device 5000 may be configured to supply the drive voltage to various other components therein, such as an external sensor, a wireless communication module, an external control circuit, and the like, from the second charge/discharge unit 700.

Other Exemplary Embodiments

Hereinafter, the configurations and functions of LED lighting devices according to yet other exemplary embodiments of the present disclosure will be described with reference to FIG. 11 to FIG. 16. The LED lighting devices according to the other exemplary embodiments of the present disclosure described with reference to FIG. 11 to FIG. 16 are configured to control charge/discharge of a capacitor using a drive current controller. Hereinafter, these exemplary embodiments will be described in more detail.

Figure 11:
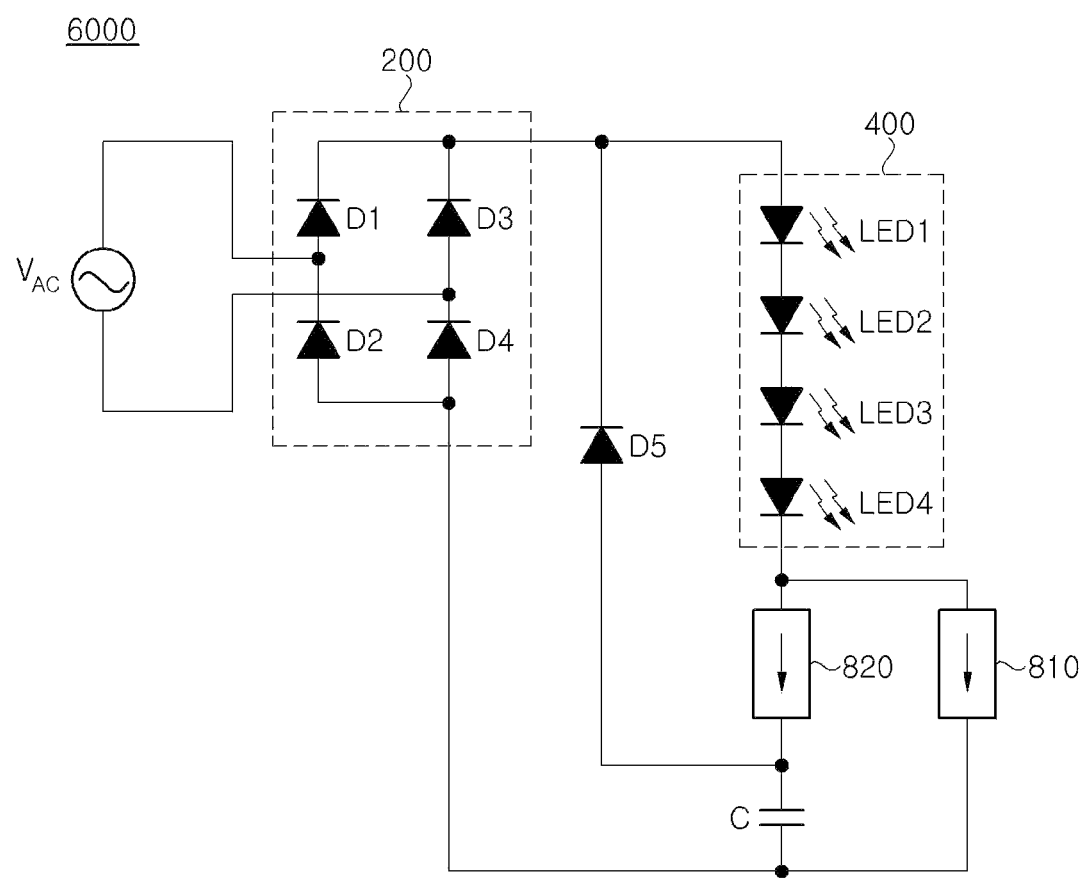
FIG. 11 is a circuit diagram of an LED drive circuit according to exemplary embodiments of the present disclosure.
Figure 12:
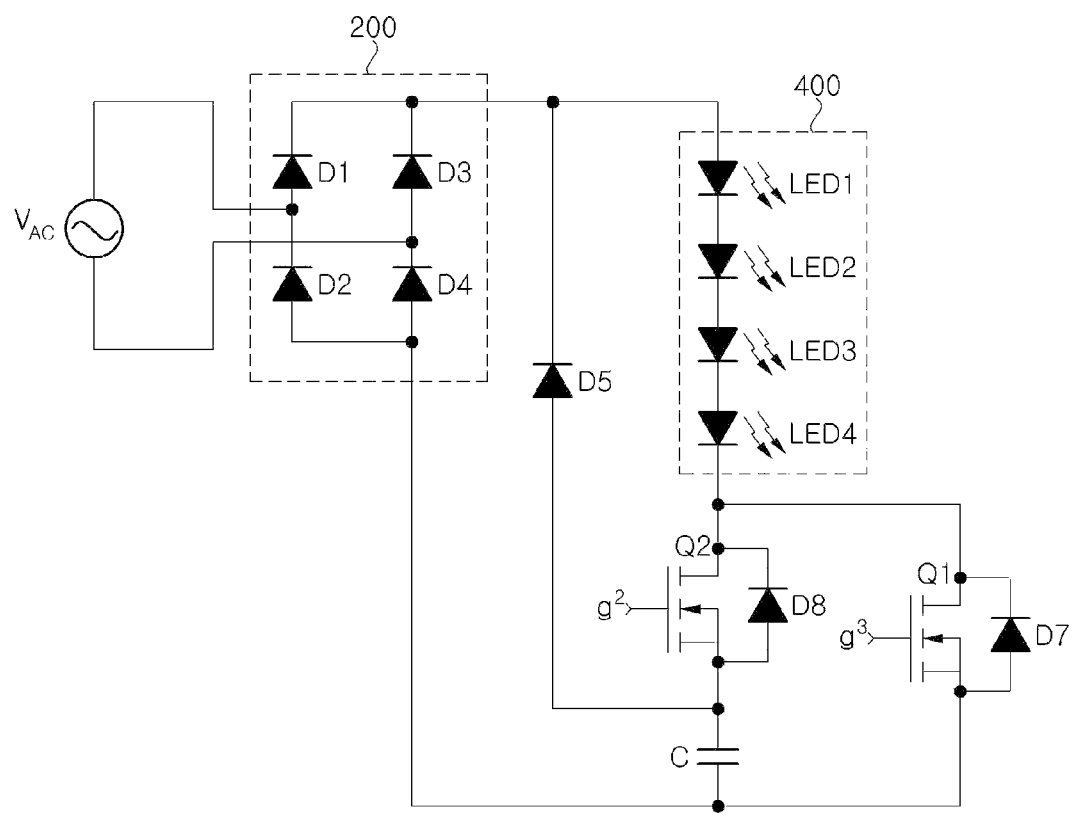
FIG. 12 is a circuit diagram of an LED drive circuit according to a sixth exemplary embodiment of the present disclosure.

Configuration and Function of LED Lighting Device 6000 According to Other Exemplary Embodiments FIG. 11 is a circuit diagram of an LED drive circuit according to exemplary embodiments of the present disclosure and FIG. 12 is a circuit diagram of an LED drive circuit according to a sixth exemplary embodiment of the present disclosure.

Referring to FIG. 11, an LED lighting device 6000 according to other exemplary embodiments of the present disclosure includes a rectification unit 200, a drive current controller, an LED light emitting unit 400, and a capacitor C.

The LED light emitting unit 400 includes a plurality of LED groups including at least two LEDs connected to each other in series or in parallel. Although the LED lighting device 6000 according to the exemplary embodiments is shown as including first to fourth LED groups (LED1 to LED4), it should be understood that the number of LED groups can be changed, as needed.

The rectification unit 200 generates and outputs a drive voltage Vp in the form of ripple voltage through rectification of alternating voltage VAC supplied from an AC power source. As the rectification unit 10, any well-known rectification circuit, such as a full-wave rectification circuit or a half-wave rectification circuit, may be used. For example, the rectification unit 200 may be a bridge full-wave rectification circuit composed of four diodes D1, D2, D3, D4.

The drive current controller may include a fifth diode D5 connected in parallel to the LED light emitting unit, a second drive current circuit 820 disposed between the LED light emitting unit 400 and the capacitor C to be connected thereto in series, and a first drive current circuit 810 connected in parallel to the second drive current circuit 820 and the capacitor C.

The fifth diode D5 allows a drive current to flow to the LED light emitting unit 400 when the capacitor C is discharged.

The first drive current circuit 810 connects the capacitor C to the LED light emitting unit 400 in parallel so as to discharge the capacitor C in a second interval in which the voltage level of the drive voltage Vp is less than the forward voltage level of the LED light emitting unit 400.

The second drive current circuit 820 connects the capacitor C to the LED light emitting unit 400 in series so as to charge the capacitor C in a first interval in which the voltage level of the drive voltage Vp is higher than or equal to the forward voltage level of the LED light emitting unit 400.

That is, the LED lighting device according to the exemplary embodiments is configured to allow charges from the capacitor C charged with energy in the first interval to be supplied in the second interval defined as a non-luminous interval, thereby improving luminous efficacy and flicker performance.

In addition, the LED lighting device according to the exemplary embodiments can satisfy standards for power factor and total harmonic distortion.

The drive current controller will be described in more detail with reference to FIG. 12 to FIG. 15.

Configuration Function of LED Lighting Device According to Sixth Exemplary Embodiment Referring to FIG. 12, the drive current controller according to the sixth exemplary embodiment includes a first drive current circuit including a first switching element Q1 and a second drive current circuit including a second switching element Q2.

The first and second switching elements Q1, Q2 may be realized by a bipolar junction transistor (BJT), a field effect transistor (FET), and the like, without being limited thereto. For example, the first and second switching elements Q1, Q2 may be MOSFETs.

Although not shown in detail, the first and second switching elements Q1, Q2 may be controlled depending upon the level of drive current input from a drive IC.

The first switching element Q1 may include a seventh diode D7 for stable constant current driving and the second switching element Q2 may include an eighth diode D8 for stable constant current driving.

In the LED drive circuit according to the sixth exemplary embodiment, the first switching element Q1 is turned off and the second switching element Q2 is turned on to connect the capacitor C to the LED light emitting unit 400 in series in the first interval in which the voltage level of the drive voltage is higher than or equal to the forward voltage level of the LED light emitting unit 400. As a result, the capacitor C can be charged.

Further, in the second interval in which the voltage level of the drive voltage is less than the forward voltage level of the LED light emitting unit 400, the first switching element Q1 is turned on and the second switching element Q2 is turned off to connect the capacitor C to the LED light emitting unit 400 in parallel. As a result, the capacitor C can be discharged.

According to this exemplary embodiment, the LED lighting device allows the LED light emitting unit 400 to be driven by charges stored in the capacitor C, which is charged in a non-luminous interval of general AC sequential driving, thereby improving luminous efficacy and flicker performance through removal of the non-luminous interval.

Figure 13:
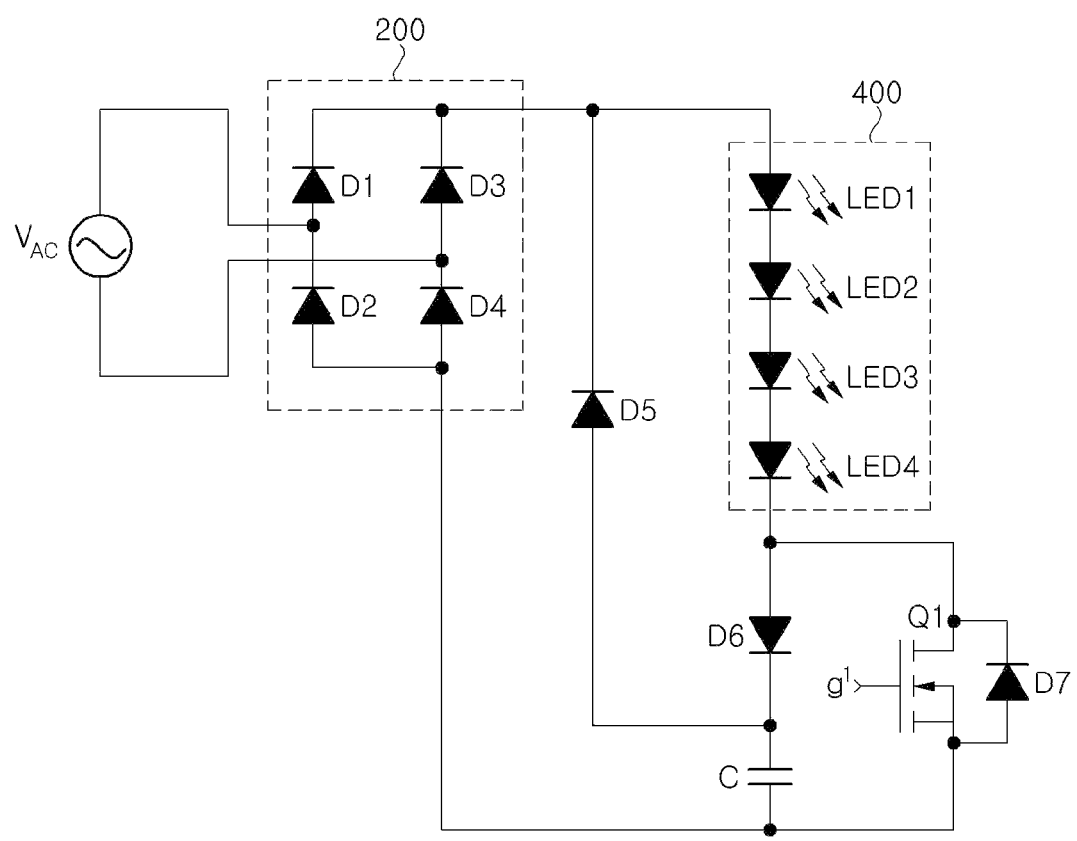
FIG. 13 is a circuit diagram of an LED drive circuit according to a seventh exemplary embodiment of the present disclosure.

Constitution and Function of LED Lighting Device According to Seventh Exemplary Embodiment FIG. 13 is a circuit diagram of an LED drive circuit according to a seventh exemplary embodiment of the present disclosure.

As shown in FIG. 13, the LED drive circuit according to the seventh exemplary embodiment has the same components as the LED drive circuit according to the sixth exemplary embodiment excluding a second drive circuit including a sixth diode D6, and thus the same components thereof will be denoted by the same reference numerals and detailed descriptions thereof will be omitted.

In the LED drive circuit according to the seventh exemplary embodiment, the first switching element Q1 is turned off to allow the capacitor C and the LED light emitting unit 400 to be connected in series through the sixth diode D6, in the first interval in which the voltage level of the drive voltage is higher than or equal to the forward voltage level of the LED light emitting unit 400. As a result, the capacitor C can be charged.

In the second interval in which the voltage level of the drive voltage is less than the forward voltage level of the LED light emitting unit 400, the first switching element Q1 is turned on to allow the capacitor C and the LED light emitting unit 400 to be connected in parallel. As a result, the capacitor C can be discharged.

According to this exemplary embodiment, the LED lighting device allows the LED light emitting unit 400 to be driven by charges stored in the capacitor C, which is charged in the non-luminous interval of general AC sequential driving, thereby improving luminous efficacy and flicker performance through removal of the non-luminous interval.

Figure 14:
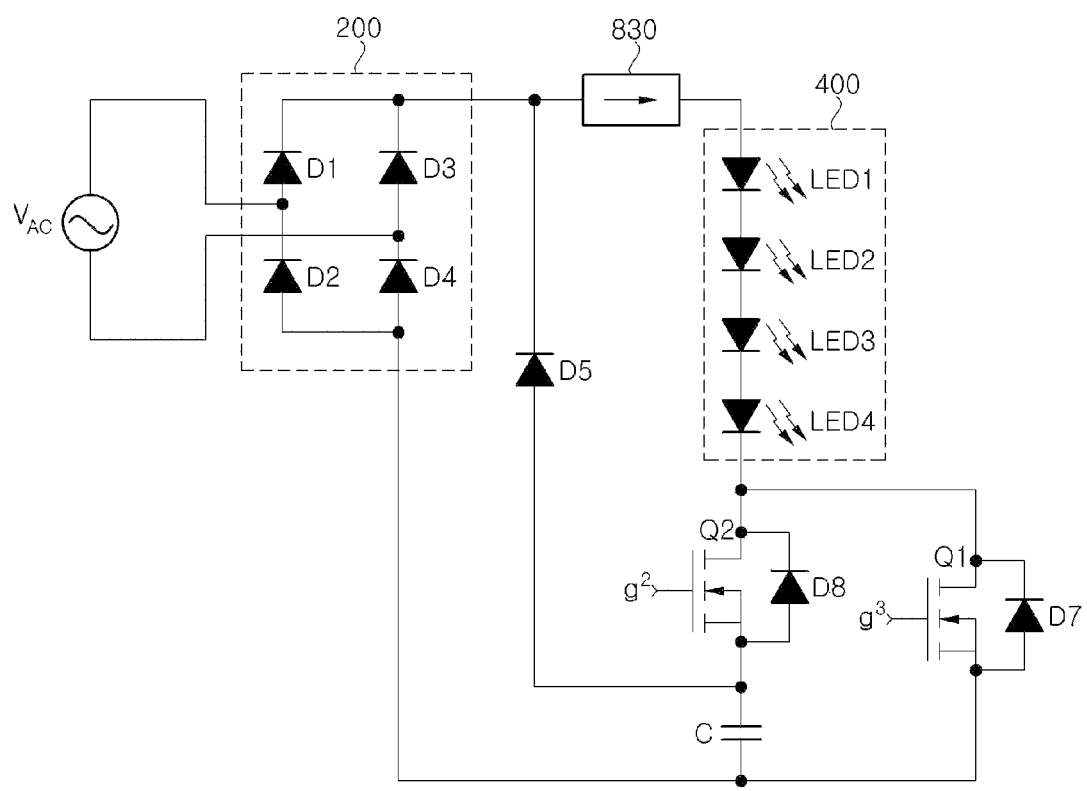
FIG. 14 is a circuit diagram of an LED drive circuit according to an eighth exemplary embodiment of the present disclosure.
Figure 15:
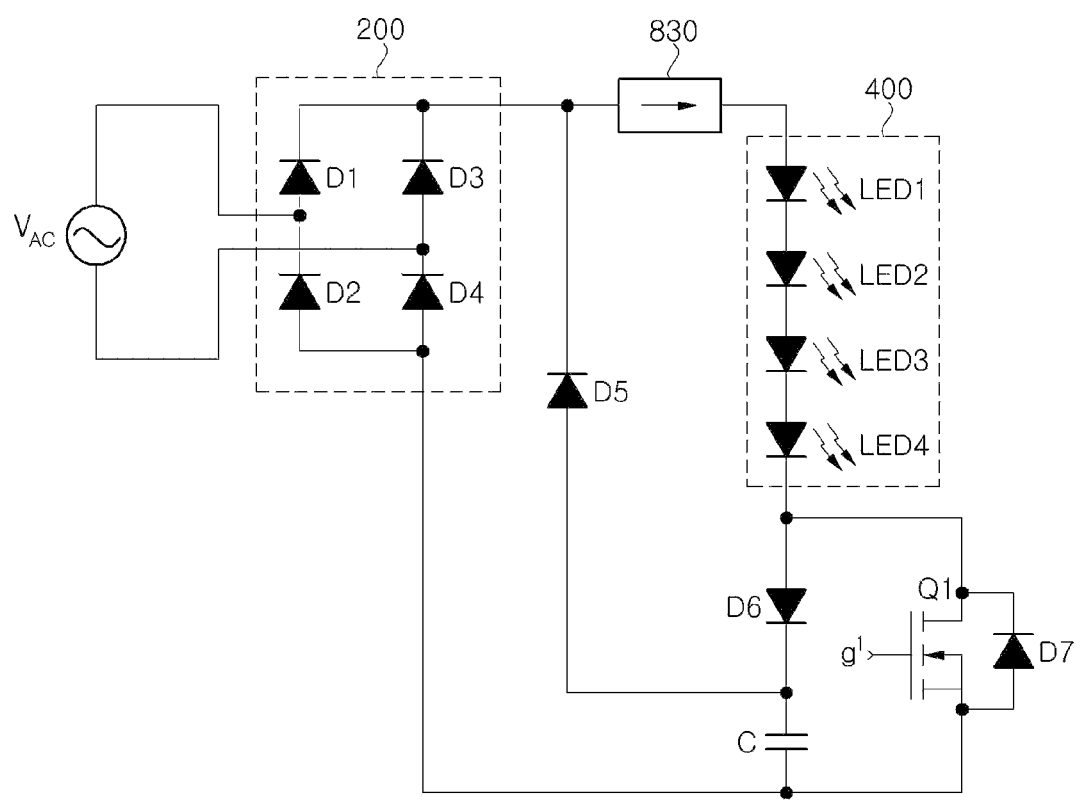
FIG. 15 is a circuit diagram of an LED drive circuit according to a ninth exemplary embodiment of the present disclosure.

Configurations and Functions of LED Lighting Devices According to Eighth and Ninth Exemplary Embodiments FIG. 14 is a circuit diagram of an LED drive circuit according to an eighth exemplary embodiment of the present disclosure and FIG. 15 is a circuit diagram of an LED drive circuit according to a ninth exemplary embodiment of the present disclosure.

As shown in FIG. 14 and FIG. 15, the LED drive circuits according to the eighth and ninth exemplary embodiments include the same components as the LED drive circuits according to the sixth and seventh exemplary embodiments excluding a third drive current circuit 830, and thus the components thereof will be denoted by the same reference numerals and detailed descriptions thereof will be omitted.

The third drive current circuit 830 is connected between the rectification unit 200 and the LED light emitting unit 400 to prevent electric current from flowing in a reverse direction.

The third drive current circuit 830 may include at least one diode or at least one switching element. Here, the switching element may be realized by a bipolar junction transistor (BJT), a field effect transistor (FET), and the like, without being limited thereto. For example, the switching element may be a MOSFET.

Figure 16:
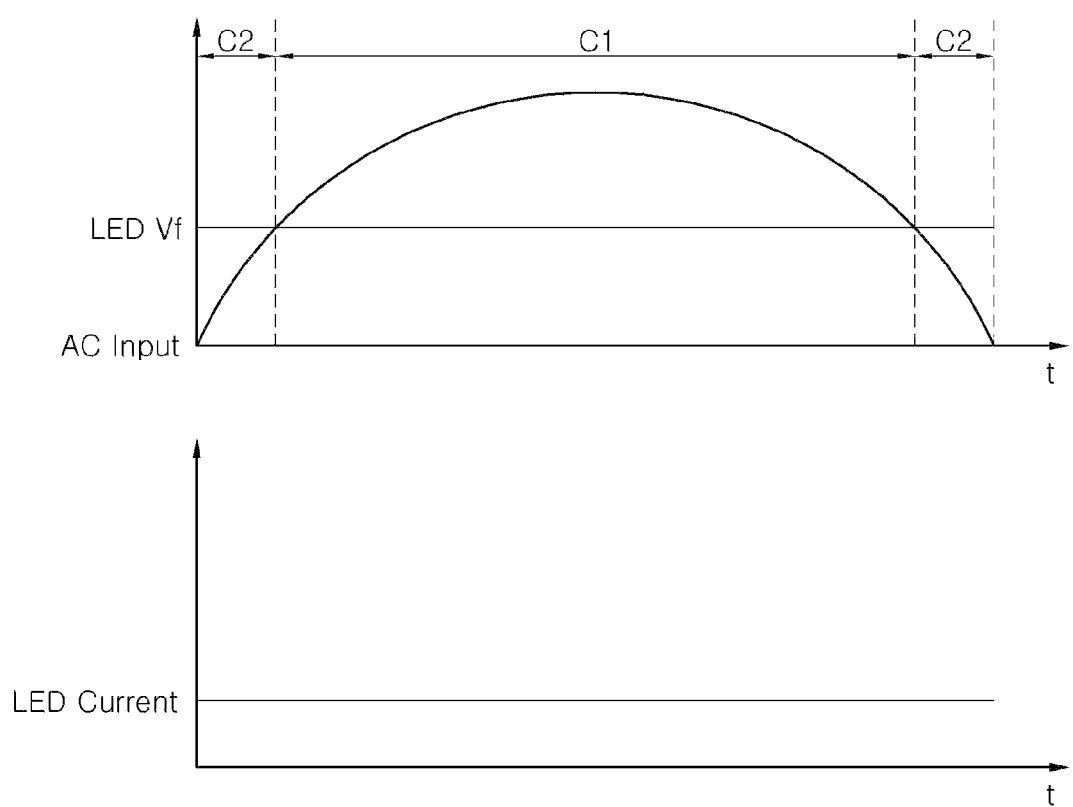
FIG. 16 shows graphs depicting an operation interval of an LED group depending upon an input voltage (drive voltage) level of the LED lighting device according to the sixth exemplary embodiment of the present disclosure.

Example of Operation of LED Lighting Device According to Sixth Exemplary Embodiment FIG. 16 shows graphs depicting an operation interval of an LED group depending upon an input voltage (drive voltage) level of the LED lighting device according to the sixth exemplary embodiment.

As shown in FIG. 12 and FIG. 16, in the LED drive circuit according to this exemplary embodiment, the capacitor C can be charged in a first interval C1 in which the voltage level of an input voltage (AC input) is higher than or equal to the forward voltage level Vf. That is, the LED light emitting unit 400 is connected in series to the capacitor C in the first interval C1. Here, the LED light emitting unit 400 can be stably driven by a constant current in the first interval C1 in which the voltage level of an input voltage (AC input) is higher than or equal to the forward voltage level Vf.

Further, the capacitor C may be discharged in a second interval C2 in which the voltage level of the input voltage (AC input) is less than the forward voltage level Vf. That is, the LED light emitting unit 400 is connected in parallel to the capacitor C in the second interval C2. Here, the LED light emitting unit 400 can be driven by charges stored in the capacitor C in the second interval C2.

According to this exemplary embodiment, the LED lighting device allows the LED light emitting unit 400 to be driven by charges stored in the capacitor C, which is charged in the non-luminous interval of general AC sequential driving, thereby improving luminous efficacy and flicker performance through removal of the non-luminous interval.

In addition, the LED lighting device according to the exemplary embodiment can satisfy standards for power factor and total harmonic distortion.

Although some exemplary embodiments have been described herein, it should be understood that these embodiments are given by way of illustration only and that individual structures, elements or features of a particular embodiment are not limited to that particular embodiment and can be applied to other embodiments without departing from the spirit and scope of the present disclosure.

The invention claimed is:

1. A light emitting diode (LED) drive circuit, comprising:
an LED light emitting unit;
a drive current controller configured to control a drive current flowing to the LED light emitting unit; and
a capacitor connected in series to the LED light emitting unit in a first interval in which an input voltage higher than or equal to a forward voltage level for driving the LED light emitting unit is supplied,
wherein:
the drive current controller comprises:
    a first diode connected in parallel with the LED light emitting unit;
    a second drive current circuit connected in series with the LED light emitting unit and the capacitor, the second drive current circuit and the capacitor being directly connected to each other; and
    a first drive current circuit connected in parallel with the series connection of the second drive current circuit and the capacitor;
wherein the parallel connection of the first drive current circuit and the series connection of the second drive current circuit and the capacitor is connected in series with the LED light emitting unit; and wherein the capacitor is connected in parallel to the LED light emitting unit in a second interval in which an input voltage less than the forward voltage level for driving the LED light emitting unit is supplied.

2. The LED drive circuit according to claim 1, wherein the first and second drive current circuits comprise a diode or a switching element.

3. The LED drive circuit according to claim 2, wherein the switching element comprises one of a bipolar junction transistor (BJT) and a field effect transistor (FET).

4. The LED drive circuit according to claim 1, wherein the first drive current circuit comprises a first switching element connecting the LED light emitting unit to the capacitor in parallel, and the second drive current circuit comprises a second switching element connecting the LED light emitting unit to the capacitor in series.

5. The LED drive circuit according to claim 1, wherein the second drive current circuit comprises a second diode connecting the LED light emitting unit to the capacitor in series, and the first drive current circuit comprises a switching element connecting the LED light emitting unit to the capacitor in parallel.

6. The LED drive circuit according to claim 1, further comprising:
a rectification circuit generating and outputting a drive voltage for driving the LED light emitting unit through full-wave rectification of alternating current (AC) power input thereto; and
a third drive current circuit disposed between the rectification circuit and the LED light emitting unit.

7. The LED drive circuit according to claim 6, wherein the third drive current circuit comprises a diode or a switching element.

8. The LED drive circuit according to claim 7, wherein the switching element comprises one of a bipolar junction transistor (BJT) and a field effect transistor (FET).

9. The LED drive circuit according to claim 6, wherein each of the first to third drive current circuits further comprises a third diode for stable constant current driving.

* * * * *